United States Patent
Burjes et al.

(10) Patent No.: US 11,396,231 B2
(45) Date of Patent: Jul. 26, 2022

(54) DRIVETRAIN OVERLOAD PROTECTION FOR WORK VEHICLES USING POWER BOOST

(71) Applicant: Deere & Company, Moline, IL (US)

(72) Inventors: Roger W. Burjes, Waterloo, IA (US); Rainer Gugel, Plankstadt (DE); David Mueller, Dettenheim (DE); Adam J. Faucher, Cedar Falls, IA (US); Marcus L. Kuhl, Cedar Falls, IA (US); Clayton P. Neumann, Cedar Falls, IA (US); Jacob Pence, Bettendorf, IA (US)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 16/933,008

(22) Filed: Jul. 20, 2020

(65) Prior Publication Data
US 2022/0016974 A1    Jan. 20, 2022

(51) Int. Cl.
*B60K 17/28* (2006.01)
*B60W 10/04* (2006.01)
*B60W 10/30* (2006.01)

(52) U.S. Cl.
CPC .............. *B60K 17/28* (2013.01); *B60W 10/04* (2013.01); *B60W 10/30* (2013.01); *B60W 2400/00* (2013.01); *B60W 2720/40* (2013.01); *F16D 2500/10437* (2013.01)

(58) Field of Classification Search
CPC ....... B60K 17/28; B60W 10/04; B60W 10/06; B60W 10/08; B60W 10/103; B60W 10/30; B60W 20/10; B60W 30/184; B60W 2400/00; B60W 2720/40; F16D 2500/10437
See application file for complete search history.

(56) References Cited

U.S. PATENT DOCUMENTS 7,779,616 B2    8/2010   Sheidler et al.
7,972,240 B2 *  7/2011   Janasek ........... B60W 30/18172
                                                         477/39

(Continued)

FOREIGN PATENT DOCUMENTS

DE    19512637 A1    10/1996
DE    19740346 A1    3/1999

(Continued)

OTHER PUBLICATIONS

US 10,550,921 B2, 02/2020, McKinzie et al. (withdrawn)

(Continued)

*Primary Examiner* — Edwin A Young
(74) *Attorney, Agent, or Firm* — Tucker Ellis LLP

(57) ABSTRACT

Overload protection systems and methods are provided for controlling the amount of energy delivered to the drivetrain of work vehicles including axles, transmission, and other components thereof including for vehicles using power boost. A sensor in operative communication with a primary power equipment unit driving a transmission of a work vehicle generates a torque signal representative of torque delivered to the transmission by the primary power equipment unit. The overload protection method and system uses the torque signal to control the torque delivered to the transmission of a work vehicle by the primary power equipment unit.

19 Claims, 5 Drawing Sheets

(56) References Cited

U.S. PATENT DOCUMENTS

| | | | |
|---|---|---|---|
| 7,992,370 | B2 | 8/2011 | Sheidler et al. |
| 8,216,109 | B2 * | 7/2012 | Dahl .................... F16H 61/472 |
| | | | 477/37 |
| 8,781,694 | B1 | 7/2014 | Sheidler et al. |
| 9,002,595 | B2 * | 4/2015 | Davis ................ B60W 30/1882 |
| | | | 701/51 |
| 9,206,885 | B2 | 12/2015 | Rekow et al. |
| 9,562,592 | B2 | 2/2017 | Rekow et al. |
| 2003/0119625 | A1 * | 6/2003 | Bordini ................ B60W 10/08 |
| | | | 477/3 |
| 2005/0131611 | A1 * | 6/2005 | Anderson .............. B60K 31/04 |
| | | | 701/50 |
| 2009/0233664 | A1 | 9/2009 | Sheidler et al. |
| 2011/0166752 | A1 * | 7/2011 | Dix ...................... F16H 61/472 |
| | | | 701/50 |
| 2014/0277879 | A1 * | 9/2014 | Sheidler ............... B60W 10/08 |
| | | | 701/22 |
| 2018/0264928 | A1 * | 9/2018 | Takaki .................. B60K 6/543 |
| 2020/0114919 | A1 | 4/2020 | Billich |
| 2021/0129670 | A1 | 5/2021 | Vande Haar et al. |

FOREIGN PATENT DOCUMENTS

| | | |
|---|---|---|
| DE | 112013004825 T5 | 9/2015 |
| WO | 2019110230 A1 | 6/2019 |

OTHER PUBLICATIONS

US 10,550,922 B2, 02/2020, Rekow et al. (withdrawn)
German Search Report dated Mar. 21, 2022 for Application Serial No. DE102021115611 (12 pages).
The Institute of Electrical and Electronics Engineers, Inc., LAN/MAN Standards Committee of the IEEE Computer Society "IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Std 802.11 ™-2020" (4,379 pages).

* cited by examiner

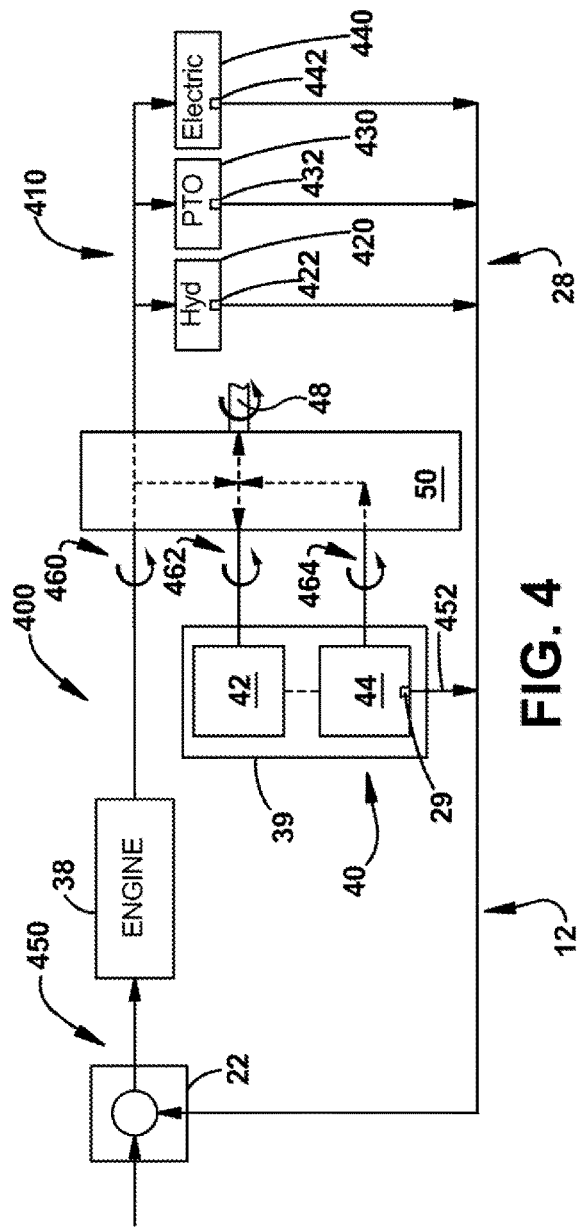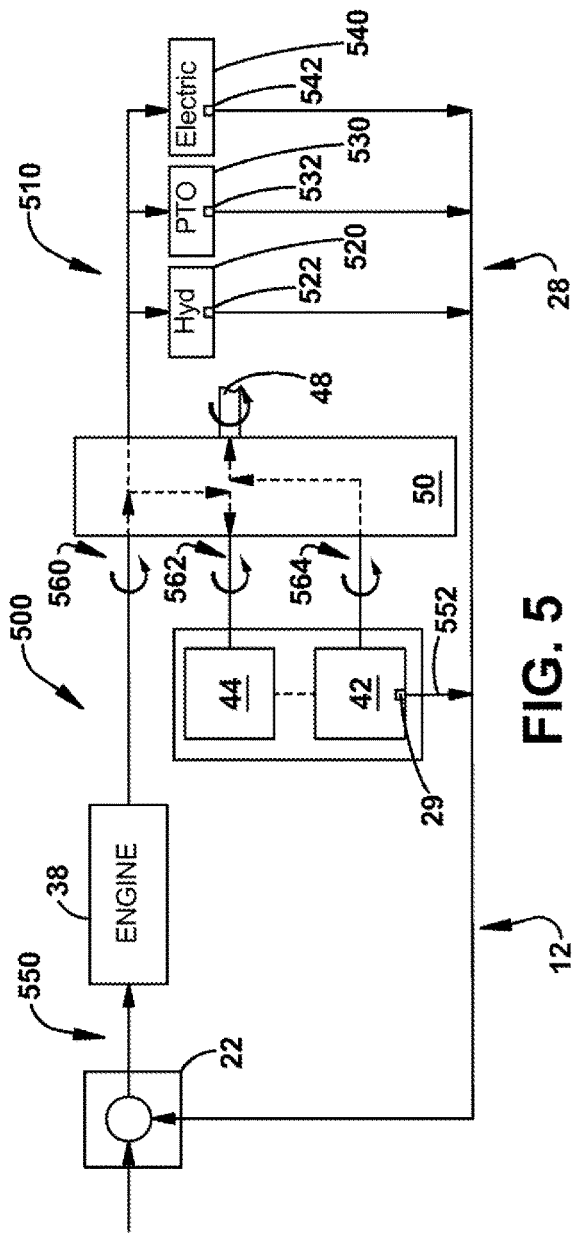

DRIVETRAIN OVERLOAD PROTECTION FOR WORK VEHICLES USING POWER BOOST

FIELD OF THE DISCLOSURE

The present disclosure relates to work vehicle powertrain protection, including overload protection systems for protecting the powertrains from overloading and possible damage when applying engine power to the powertrains. Although the example embodiments will be described with reference to overload protection systems for protecting the powertrains from overloading and possible damage when applying engine power to the powertrains in a boost mode of the work vehicle above a rated power of the engine, it is to be appreciated that the invention is not limited to those example embodiments.

BACKGROUND

Working vehicle-working device combinations are known, in particular as a working vehicle that is connected to working devices, in particular as a working vehicle having coupled or attached working devices or implements. Many different associated driven working implements operable complimentary to the work vehicle in a joint working application of the work vehicle are possible. The driven implements may be powered by one or more sources onboard the working vehicle for sharing power of the working vehicle with the implements or for developing extra power for delivery to support the added load of the associated implements. An example is a power takeoff (PTO) driven by a hydraulic power source on the working vehicle driven by the engine of the working vehicle. Other examples include mechanical, and/or electric power equipment unit power sources on the working vehicle driven by the vehicle engine. These various driven implements are typically used in field applications such as rear-mounted snow blowers, sugar beet harvesting, forage harvesting, potato harvesting, rotary cutters, mower conditioners, flail mowers, balers, soil stabilizing, power harrow, vegetable bed formers, and muck spreaders, to name a few.

The working vehicle may be used in order to pull or push the working device implements in agriculture for field work, wherein the working vehicle may be a tractor or the like. In other applications such as in the construction industry the working vehicle may be an earthmoving towing machine such as a bulldozer, grader or the like. The working vehicle may be two-wheeled, three-wheeled or four-wheeled, or may have more wheels or may comprise a track. Furthermore, the working vehicle may comprise a two-wheel or four-wheel drive system. A working vehicle may comprise a driver cabin, a motor and a transmission. The working vehicle may drive working devices such as working implements that are pulled on the ground while imparting work to the ground such as tilling the ground, working devices that come into engagement with the ground or soil, working devices that come into engagement with objects that are on the ground or located therein, or may others.

The working vehicle-working device combination may also comprise a part system, in particular an actuating unit such as a power takeoff (PTO) driven by a hydraulic, mechanical, and/or electric power equipment unit power source on the working vehicle and/or a mounting device such as a three-point power lift or a hoist. The part system renders it possible to connect the working devices or working implements to the working vehicle in a simple manner, in other words to arrange or to attach or to couple the working devices in front of or to the rear of the working vehicle. In this case, the working vehicle and the working devices form a functional unit, by way of example in that the coupling points on the working vehicle are brought into connection with the corresponding receiving arrangements of the working device. The part system of the working vehicle may also be used in order to adjust the working devices relative to the working vehicle or to the ground such as in order to lift or lower the working devices relative to the working vehicle or ground. The part system may be arranged or fastened on the working vehicle, i.e., it may be detachably connected. The term "working device" as it is used here includes without limitation practically any objects that may be arranged on a working vehicle or that may be operated from this working vehicle. The working devices may be a trailer, a roller or a cultivator or any other device or system for performing the field applications named above and others.

The use of the working devices places high demands upon the working vehicle-working device combination, in particular on the adjustment and the cooperation of the working vehicle with the working devices. When it is desired to perform work using the working vehicle-working device combination in a rapid and efficient manner it is best to use a coordinated operation between the working vehicle and the working devices. The coordinated operation of the working vehicle-working device combination, however, depends in large part upon the adjustment of the towing force, in other words the force with which the working devices engage with, load, or pull on the working vehicle. By way of example, there is the possibility of the working vehicle coming to a standstill or the motor stalling in the absence of a towing force regulating procedure in the case of intensely inhomogeneous or particularly moist ground owing to a particularly large resistance force on the working device while powering the one or more hydraulic, mechanical, and/or electric power equipment unit power sources driving the working implements operable complimentary to the work vehicle in cooperative field applications.

For this reason, it is possible to provide a towing force regulating procedure that strives to prevent the motor from stalling and/or to prevent a reduction of the slip of the drive wheels in that the towing force of the working device on the working vehicle is measured and the working vehicle-working device combination is adjusted.

One known towing force regulating procedure functions essentially as follows. Initially the towing force is directly measured using force measuring pins or an equivalent (that may include an extensometer) for measuring the towing force of the working device on the working vehicle and for producing a signal that indicates the towing force. A deviation from a predetermined reference towing force is determined. Subsequently, in the event of a deviation being present, a position of the working device with respect to the working vehicle or the ground is typically adjusted or the working vehicle is accelerated or braked. Consequently, a significant problem of the known working vehicle-working device combinations and methods for operating the working vehicle-working device combination is that these combinations and methods provide too few mechanisms for adjusting the working vehicle-working device combination, including the working vehicle, with the result that a precise and efficient towing force regulating procedure is not possible. This may lead to inconsistent field operations owing to wheel slip, inadequate ground speed or the like, and may possibly also lead to damage of drivetrain components if the towing force cannot be regulated to within the design limits of the drivetrain and its associated components.

A further disadvantage of the force measuring pins is that the accuracy of the signal that is produced may be dependent upon the type of the working device. Moreover, the known force measuring pins for measuring the towing force may rapidly become soiled, which causes an erroneous towing force measurement. The force measuring pins also require a considerable physical installation space in the working vehicle-working device combination. Consequently, a further problem of the known towing force regulating procedures and the known systems for regulating the towing force of a working vehicle-working device combination may be that the towing force regulating procedures are not sufficiently reliable or are too imprecise or complex and therefore too cost-intensive in production and maintenance. Therefore, inconsistent field operations and damage to the drivetrain components may occur.

A further known procedure for overcoming problems associated with towing force regulation is known as "power boost" or Intelligent Power Management™ (IPM™). Power boost (or IPM), functions to operate the engine of the work vehicle above a rated power of the engine when it is determined that selected load paradigms are present. For example, the tractor may enter into IPM when additional loads are engaged for servicing by the engine. The selected loading paradigms may include PTO activation and transport activation by way of examples. An example would be the engagement of a PTO to service a ground working implement when the tractor and towed vehicle are traversing a field at a designated rate. IPM provides a controlled power boost to the engine of the working vehicle such as for example of up to 26 engine kW (35 engine hp) above the power rating of the engine under predetermined operating conditions such as the working vehicle moving and the PTO being under load. Power is also boosted for example while the working vehicle is used in transport such as at speeds above about 14.3 mph and during acceleration and/or deceleration. In an example, PTO activation may be determined such as for example by energizing and de-energizing a clutch on the PTO and sensing a slip in a PTO clutch while under power, and the engine is operated above is rated power such as for example from about x engine kW (y engine hp) to about x+26 engine kW (y+35 engine hp) when the PTO is determined to be activated and while the work vehicle is moving forward at about 0.5 km/h (0.3 mph).

However, while the use of IPM may be effective for providing power to auxiliary power consuming devices and systems on the work vehicle such as for example hydraulic, mechanical, and/or electric power equipment unit power sources for use in field applications and that are driven by the tractor engine, the amount of power delivered to the transmission by virtue of the increased engine operation while in the boost mode may lead to possible damage of drivetrain components if the primary power equipment unit driven by the boosted engine and in turn driving the transmission cannot be regulated to deliver a torque to the transmission within the design limits of the drivetrain and its associated components.

Based on the above, therefore, there is a need for an overload protection system and method for controlling the amount of energy delivered to the transmission of a work vehicle for preventing damage to the transmission and its components.

There is further a need for an overload protection system and method for controlling the amount of energy in the form of torque delivered to the transmission of a work vehicle in the form of torque for preventing damage to the transmission and its components.

SUMMARY

The embodiments herein provide new and improved overload protection systems and methods for controlling the amount of energy delivered to the transmission of a work vehicle for preventing damage to the transmission and its components.

In accordance with an aspect, an overload protection system controls torque delivered to the transmission of a work vehicle by a primary power equipment unit.

In accordance with an aspect, an overload protection system controls torque delivered to the transmission of a work vehicle by an electric motor generator (MG) pair primary power equipment unit.

In accordance with an aspect, an overload protection system controls torque delivered to the transmission of a work vehicle by an electric motor generator (MG) pair continuously variable motor (CVM) primary power equipment unit.

In accordance with a further aspect, the overload protection system includes a primary power equipment torque sensor in operative communication with a primary power equipment unit driving the transmission of the work vehicle. The primary power equipment torque sensor generates a primary power equipment torque signal representative of torque delivered to the transmission by the primary power equipment unit. The overload protection system uses the primary power equipment torque signal to control the torque delivered to the transmission of a work vehicle by the primary power equipment unit.

In accordance with yet a further aspect, the overload protection system controller includes a processor, an input operatively coupled with the processor and receiving the primary power equipment torque signal, a non-transient memory device operatively coupled with the processor, and overload protection logic stored in the memory device, wherein the overload protection logic is executable by the processor to limit a magnitude of an engine torque setpoint signal based on the primary power equipment torque signal to control the torque delivered to the transmission by the primary power equipment unit to less than a torque design value.

In accordance with an aspect, an overload protection system is provided for controlling torque delivered to a transmission of an associated work vehicle by a primary power equipment unit. The overload protection system in accordance with an example includes a primary power equipment torque sensor in operative communication with the primary power equipment unit, and an overload protection system controller. The primary power equipment torque sensor generates a primary power equipment torque signal representative of torque delivered to the transmission by the primary power equipment unit. The overload protection system controller includes a processor, an input operatively coupled with the processor and receiving the primary power equipment torque signal, a non-transient memory device operatively coupled with the processor, and overload protection logic stored in the memory device. The overload protection logic is executable by the processor to limit a magnitude a torque setpoint signal based on the primary power equipment torque signal to control the torque delivered to the transmission by the primary power equipment unit to less than a predetermined torque design value.

In accordance with a further aspect, an overload protection system is provided for controlling torque delivered to a transmission of an associated work vehicle including a primary power equipment unit, an engine operable to deliver power to the primary power equipment unit in response to an engine setpoint signal, an output shaft, and a transmission positioned between the output shaft and the primary power equipment unit such that the output shaft receives power from the primary power equipment unit to drive the output shaft. In the example embodiment, the overload protection system includes a primary power equipment torque sensor in operative communication with the primary power equipment unit, and an overload protection system controller. The primary power equipment torque sensor generates a primary power equipment torque signal representative of torque delivered to the transmission by the primary power equipment unit. The overload protection system controller includes a processor, an input operatively coupled with the processor and receiving the primary power equipment torque signal, a non-transient memory device operatively coupled with the processor, and overload protection logic stored in the memory device. In the example embodiment, the overload protection logic is executable by the processor to limit a magnitude of the engine setpoint signal based on the primary power equipment torque signal to control the torque delivered to the transmission by the primary power equipment unit to less than a torque design value.

In accordance with yet another aspect, a work vehicle is provided. The work vehicle includes a primary power equipment unit, an engine operable to deliver power to the primary power equipment unit in response to an engine setpoint signal, an output shaft, a transmission positioned between the output shaft and the primary power equipment unit such that the output shaft receives power from the primary power equipment unit to drive the output shaft, and an overload protection system controlling torque delivered to the transmission by the primary power equipment unit. In the example embodiment, the overload protection system includes a primary power equipment torque sensor in operative communication with the primary power equipment unit, and an overload protection system controller. The primary power equipment torque sensor generates a primary power equipment torque signal representative of torque delivered to the transmission by the primary power equipment unit. The overload protection system controller includes a processor, an input operatively coupled with the processor and receiving the primary power equipment torque signal, a non-transient memory device operatively coupled with the processor, and overload protection logic stored in the memory device. The overload protection logic is executable by the processor to limit a magnitude of the engine setpoint signal based on the primary power equipment torque signal to control the torque delivered to the transmission by the primary power equipment unit to less than a torque design value.

Other embodiments, features and advantages of the example embodiments for providing control of the amount of energy delivered to a transmission of a work vehicle in the form of torque for preventing damage to the transmission and its components will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify the example embodiments of the claimed invention.

FIG. 4 is a schematic illustration of an overload protection system in a work vehicle arranged in a configuration wherein a transmission is used in a "split-path" power transmission mode in accordance with an example embodiment.

FIG. 5 is a schematic illustration of an overload protection system in a work vehicle arranged in a configuration wherein a transmission is used in a "series" power transmission mode in accordance with an example embodiment.

DETAILED DESCRIPTION

Figure 1:
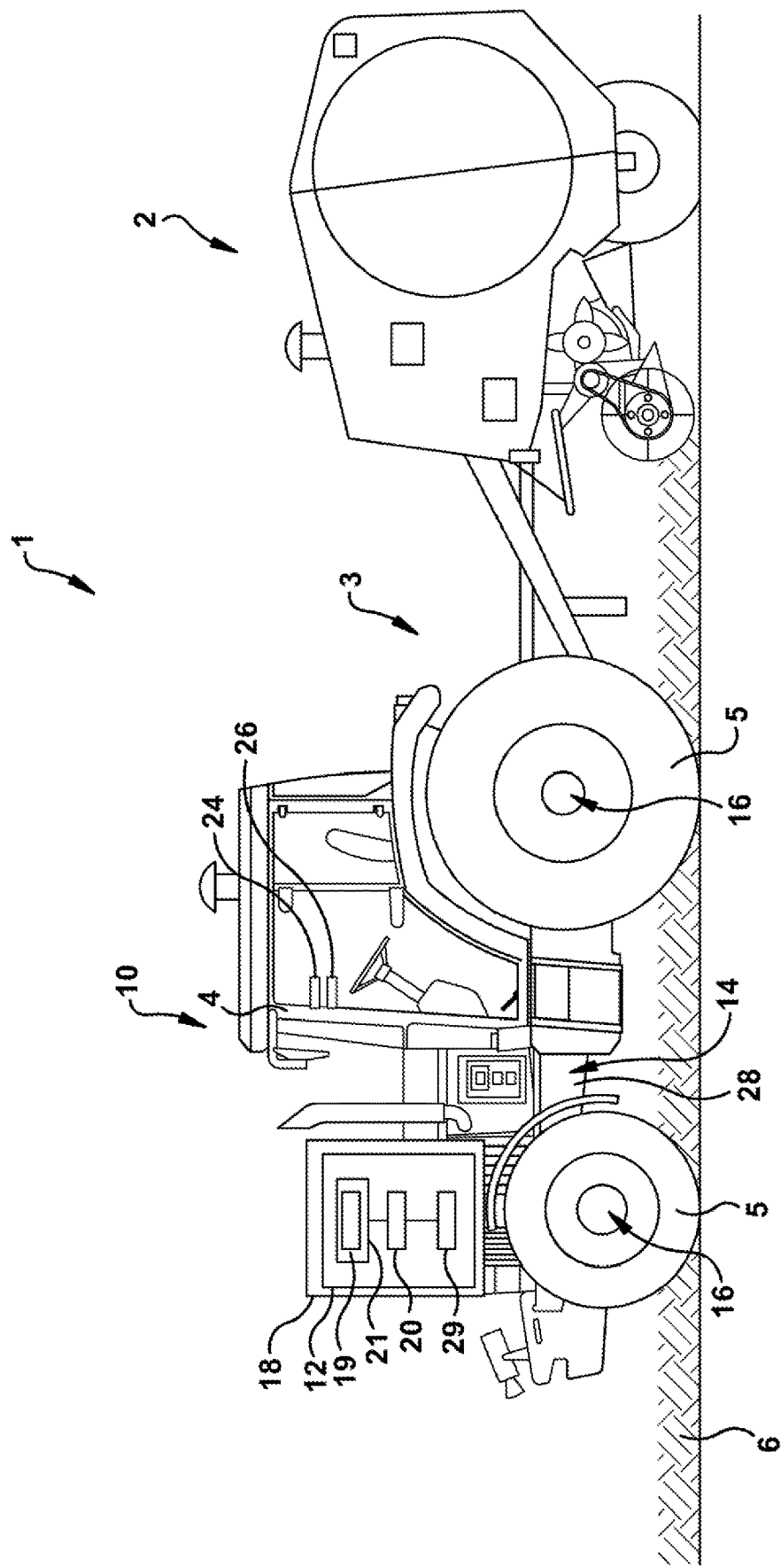
FIG. 1 illustrates a side view of a first embodiment of a working vehicle-working device combination in accordance with the present disclosure.

In the following description reference is made to the accompanying figures which form a part thereof, and in which is shown, by way of illustration, one or more example embodiments of the disclosed overload protection systems and methods for controlling torque delivered to the transmission of a work vehicle by a power equipment unit of the work vehicle to within a torque design value of the transmission and its components. The systems and methods beneficially help to prevent damage to the transmission, particularly when the engine of the work vehicle is operated in a boost mode delivering power to the work vehicle and to the power equipment unit above a rated power of the engine for supporting off-boarding of power to working devices such as working implement accessories attached to the work vehicle.

For convenience of notation, "component" may be used herein, particularly in the context of a planetary gear set, to indicate an element for transmission of power, such as a sun gear, a ring gear, or a planet gear carrier. Further, references to a "continuously" variable transmission, powertrain, or power source will be understood to also encompass, in various embodiments, configurations including an "infinitely" variable transmission, powertrain, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

In accordance with the example embodiments, it may be useful, in a variety of settings, to utilize both a traditional engine (e.g., an internal combustion engine) and at least one continuously variable power source (CVP) (e.g., an electric motor/generator or hydraulic motor/pump, and so on) with one or more continuously variable machines (CVMs) to provide useful power to an output member. For example, a portion of engine power may be diverted to drive a first CVM, which may in turn drive a second CVM. Power from the engine and/or the second CVP may be delivered to the output member (e.g., a vehicle axle or other output shaft). The engine, the CVMs, and the output member may be operatively connected via an infinitely or continuously variable transmission (CVT).

The continuously variable transmission (CVT) of the present disclosure may provide a plurality of different modes. For example, a "split-path" power transmission mode may be provided, in which power from both the engine and a CVP is combined for delivery of useful power to the output member. This is called "split-path" power transmission because it is split between a direct mechanical path from the engine and an infinitely/continuously variable path through one or more CVPs. In additional embodiments, useful power may be provided by a CVP but not by the engine (except to the extent the engine drives the CVP). This may be referred to as "CVP-only" power transmission or series mode. Finally, in some embodiments, useful power may be provided by the engine (e.g., via various mechanical transmission elements, such as shafts and gears), but not by a CVP. This may be referred to as "mechanical-path" power delivery. An example is a power takeoff (PTO) driven by a hydraulic, mechanical, and/or electric power equipment unit power source on the working vehicle and coupled to the work vehicle engine by various mechanical transmission elements other than the CVP, such as by direct connection.

In certain embodiments, an engine may provide power via various mechanical (or other) power transmission elements (e.g., various shafts and gears, and so on) to both a first input component of a variator (e.g., a planet carrier of a summing planetary gear set) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set).

As such, the example transmission of the present disclosure is a CVT that may be configured to operate over a plurality of modes that provide different output speed ranges. The example transmission includes a number of rotating components, such as shafts, clutches, bearings, and/or other components to implement such operation. The components are somewhat delicate and designed to operate during operation within design limits that vary from component to component and also with respect to the overall transmission and drivetrain in the aggregate. It is important to control the torque applied to the transmission and its components including the axles and other drivetrain components to help to prevent damage to these parts.

Accordingly, the present disclosure provides an overload protection system that monitors and/or evaluates the torque generated by a power equipment unit and delivered to the components of the powertrain, particularly the transmission. In one example, the overload protection system generates torque usage values for a component of interest based on the torque applied to the respective component. The torque applied to the respective component may be derived from the commanded torque of the CVP, which is generally generated by a vehicle controller during operation of the powertrain. In particular, the overload protection system may use a torque gear ratio constant of the designated mode to derive the torque applied to the component from the commanded torque of the CVP.

As will become apparent from the discussion herein, the disclosed overload protection system may be used advantageously in a variety of systems and with a variety of machinery. Referring now to the drawings, wherein the showings are only for the purpose of illustrating the example embodiments only and not for purposes of limiting the same, overload systems and methods, according to example embodiments, are explained on the basis of an example of an agricultural tractor with a seed drill working implement. It is to be appreciated that the embodiments of the invention as claimed can nevertheless be applied to any desired operating machine with movable operating tools, such as different kinds of tractor, harvesters, log skidders, graders, or various other work vehicle types and construction and factory automation equipment, and the like. To that end, FIG. 1 illustrates schematically a side view of a first embodiment of a working vehicle-working device combination 1 in accordance with the present disclosure. The working vehicle-working device combination 1 comprises a working vehicle 10, a working device 2 and a part system 3 that is embodied as an actuating unit.

The working vehicle 10 is an agricultural vehicle in the form of a tractor, wherein the fundamental construction of a tractor is assumed to be known to the person skilled in the art. A working vehicle 10 in the sense of the present disclosure may be any vehicle that may be used for construction work or for agricultural work such as, for example, a tractor, a telescopic handler or a construction machine.

The working vehicle 10 comprises a driver cabin 4 for receiving an operator, wherein an operating terminal for operating the tractor is arranged within the driver cabin 4. The tractor comprises multiple ground-engaging means 5, which are arranged on a front axle and a rear axle 16, in the form of air-filled wheels which are in engagement with ground 6 in order to transmit driving forces. The ground-engaging means 5 are driven by a motor, which is embodied in the form of an internal combustion engine, and a transmission that cooperates with the internal combustion engine.

An output torque of the transmission is transmitted via a drivetrain, which is illustrated schematically, to the ground engaging means 5, wherein the illustrated tractor 10 is an all-wheel drive vehicle.

As illustrated, the part system 3 is used for the purpose of coupling the working device 2 to the working vehicle 10 or adjusting the working device with the result that the working vehicle 10 may pull the working device 2 into motion (for example, towing) or may perform a specific task. In the present embodiment, the working vehicle 10 provides the propulsion force in order to pull the working device 2 if the working device 2 is performing the task. In another embodiment, the working vehicle 10 may push the working device 2.

In FIG. 1, the working device 2 is a seed drill. However, the working device 2 may be any arbitrary working device 2 that is attached to the working vehicle 10. The part system 3 may also be used with any combination of working vehicle 10 and working device 2.

As illustrated, the part system 3 is used for the purpose of coupling the working device 2 to the working vehicle 10 or adjusting the working device 2 with the result that the working vehicle 10 may pull the working device 2 into motion (for example, towing) or may perform a specific task. In the present embodiment, the working vehicle 10 provides the propulsion force in order to pull the working device 2 if the working device 2 is performing the task. In another embodiment, the working vehicle 10 may push the working device 2.

In FIG. 1, the work vehicle 10 is depicted as a tractor that may at least partially implement an overload protection system 12 associated with a powertrain 14 (shown schematically). It will be understood, however, that other configurations of the vehicle 10 may be possible, including configurations with the vehicle 10 as a different kind of tractor, a harvester, a log skidder, a grader, or one of various other work vehicle types. It will further be understood that the disclosed powertrains 14 may also be used in non-work vehicles and non-vehicle applications (e.g., fixed-location power installations). The overload protection system 12 in general includes a controller 22 operatively coupled with a power equipment torque sensor 29 for sensing torque delivered by power equipment the to the drivetrain 14 as will be described in greater detail below after a brief description of the vehicle 10 and powertrain 14.

Generally, the powertrain 14 may be configured to generate power and to transmit the power from one or more power sources (e.g., engines, motors, and/or other power sources, as discussed below) to an output member (e.g., an output shaft). In some embodiments, the powertrain 14 may transmit the power to rear and/or front axles 16 of the work vehicle 10. The powertrain 14 may further be configured to deliver power to a power take-off shaft for powering an implement that is supported on the vehicle 10 or that is supported on a separate vehicle. It will be appreciated that the powertrain 14 may be configured for delivering power to other power sinks without departing from the scope of the present disclosure.

In one example, the work vehicle 10 includes a vehicle control system 18 (or multiple controllers) to control one or more aspects of the operation of the work vehicle 10, and in some embodiments, facilitate implementation of the overload protection system 12. For example, the vehicle control system 18 may include and/or be associated with the overload protection system 12 including the overload protection controller 22 and torque sensor 29 for implementing the functions of the overload protection system 12. In one example, the vehicle control system 18 and the overload control system 12 may be implemented with processing architecture such as a processor 20 and a non-transitory memory device 21 operatively coupled with the processor 20. In the example embodiment the memory device 21 stores overload protection logic 19, wherein the overload protection logic 19 is executable by the processor to implement the functions described herein based on programs, instructions, and data stored in the memory device 21 in the overload protection logic 19 or in one or more other forms.

Therefore, in one example, the vehicle control system 18 and the overload control system 12 are provided in a common or shared control platform context including for example a shared processor, a shared memory device, and vehicle control and overload protection logic modules stored in the processor that are executable by the processor to perform vehicle control functions including transmission overload protection functions and others, and wherein signals such as engine speed and/or torque setpoint signals developed by the combined vehicle control system 18 and overload control system 12 are developed as necessary or desired, including being developed cooperatively for example, to control the vehicle and to control the torque delivered to the transmission to less than a torque design limit value for protecting the transmission components from damage. In another example, the vehicle control system 18 may be separate from and in operative communication with the overload control system 12 wherein signals such as engine speed and/or torque setpoint signals developed by the vehicle control system 18 may be modified by the overload control system 12 as necessary or desired to control the torque delivered to the transmission to less than a torque design limit value for protecting the transmission components from damage.

As such, the control systems 18, 12 may be configured as one or more computing systems with associated processor devices and memory architectures, as a hard-wired computing circuit (or circuits), as a programmable circuit, as a hydraulic, electrical or electro-hydraulic controller, or otherwise. The control systems 18, 12 may be configured to execute various computational and control functionality with respect to the work vehicle 10 (or other machinery). In some embodiments, the control systems 18, 12 may be configured to receive input signals in various formats (e.g., as hydraulic signals, voltage signals, current signals, and so on), and to output command signals in various formats (e.g., as hydraulic signals, voltage signals, current signals, mechanical movements, and so on).

The control systems 18, 12 may be in electronic, hydraulic, mechanical, or other communication with various other systems or devices of the work vehicle 10 (or other machinery). For example, the control systems 18, 12 may be in electronic or hydraulic communication with various actuators, sensors, and other devices within (or outside of) the work vehicle 10, including various devices described below. The control systems 18, 12 may communicate with other systems or devices (including other controllers) in various known ways, including via a CAN bus (not shown) of the work vehicle 10, via wireless or hydraulic communication mechanisms, or otherwise.

In some embodiments, the control systems 18, 12 may be configured to receive input commands from, and to interface with, an operator via a human-vehicle operator interface 24 that enables interaction and communication between the operator, the vehicle 10, and the overload protection system 12. The operator interface 24 may be disposed inside a cab of the work vehicle 10 for easy access by the vehicle operator. The operator interface 24 may be configured in a variety of ways. In some embodiments, the operator interface 24 may include an input device with one or more joysticks, various switches or levers, one or more buttons, a touchscreen interface that may be overlaid on a display, a keyboard, a speaker, a microphone associated with a speech recognition system, or various other human-machine interface devices. The operator interface 24 also includes the display device, which can be implemented as a flat panel display device or other display type that is integrated with an instrument panel or console of the work vehicle 10.

As one example, the operator interface 24 generally includes a number of devices for operating the vehicle 10, such as speed and mode selection devices for the powertrain 14. In further examples, the display device of the operator interface 24 may function to render vehicle usage information such as IPM boost power information and other information generated by the overload protection system 12 for display to the vehicle operator.

The work vehicle 10 further includes a vehicle communication component 26 enables communication between the operator, the control systems 18, 12, and an associated based station (not shown). The vehicle communication component 26 includes any suitable system for receiving and transmitting data, directly or through a network. For example, the communication component 26 may include a radio or suitable transceiver configured to receive and send data transmitted by modulating a radio frequency (RF) signal via a cellular telephone network according to the long-term evolution (LTE) standard, although other techniques may be used. The communication component 26 may achieve bi-directional communications over Bluetooth® or by utilizing a Wi-Fi standard, i.e., one or more of the 802.11 standards as defined by the Institute of Electrical and Electronics Engineers ("IEEE"), as is well known to those skilled in the art. Generally, the communication component 26 may include a Bluetooth® transceiver, a radio transceiver, a cellular transceiver, an LTE transceiver and/or a Wi-Fi transceiver.

The work vehicle 10 further includes various sensors 28 that function to collect information about the work vehicle 10. Such information may be provided to the control systems 18, 12 and/or the communication component 26 for potential transmission and/or use by the overload protection system 12. As examples, the sensors 28 may include operational sensors associated with the vehicle systems and components discussed above, including engine and transmission sensors, fuel sensors, and battery sensors. In one example, the sensors 28 may include one or more speed and/or torque sensors associated with the transmission of the powertrain 14, particularly one or more speed and/or torque sensors associated with an input shaft, one or more transmission shafts, and/or one or more output shafts. In some examples, the sensors 28 may be omitted. In an example embodiment, the set of sensors 28 includes a primary power equipment torque sensor 29 in operative communication with a primary power equipment unit 39 (FIG. 2) to be described in greater detail below. The primary power equipment torque sensor 29 portion of the overload protection system 12 generates a primary power equipment torque signal representative of torque delivered to the transmission by the primary power equipment unit.

As introduced above, the vehicle 10 is configured, based on commands from the vehicle controller 18, to perform various work tasks. For example, the vehicle control system 18 generates commands for the powertrain 14 (e.g., engine, motors, transmission) based on operating conditions and inputs via the operator interface 24. As described in greater detail below, the overload protection system 12 may collect information associated with the powertrain 14, particularly the transmission and motors, and generate usage and control information associated with various components of the powertrain 14 that represent the power being applied to the various powertrain components. The usage information, such as in the form of usage values or levels, may be provided to the operator (e.g., displayed on a display device of the operator interface 24) and/or transferred via the vehicle communication component 26 to the associated based station (not shown).

Figure 2:
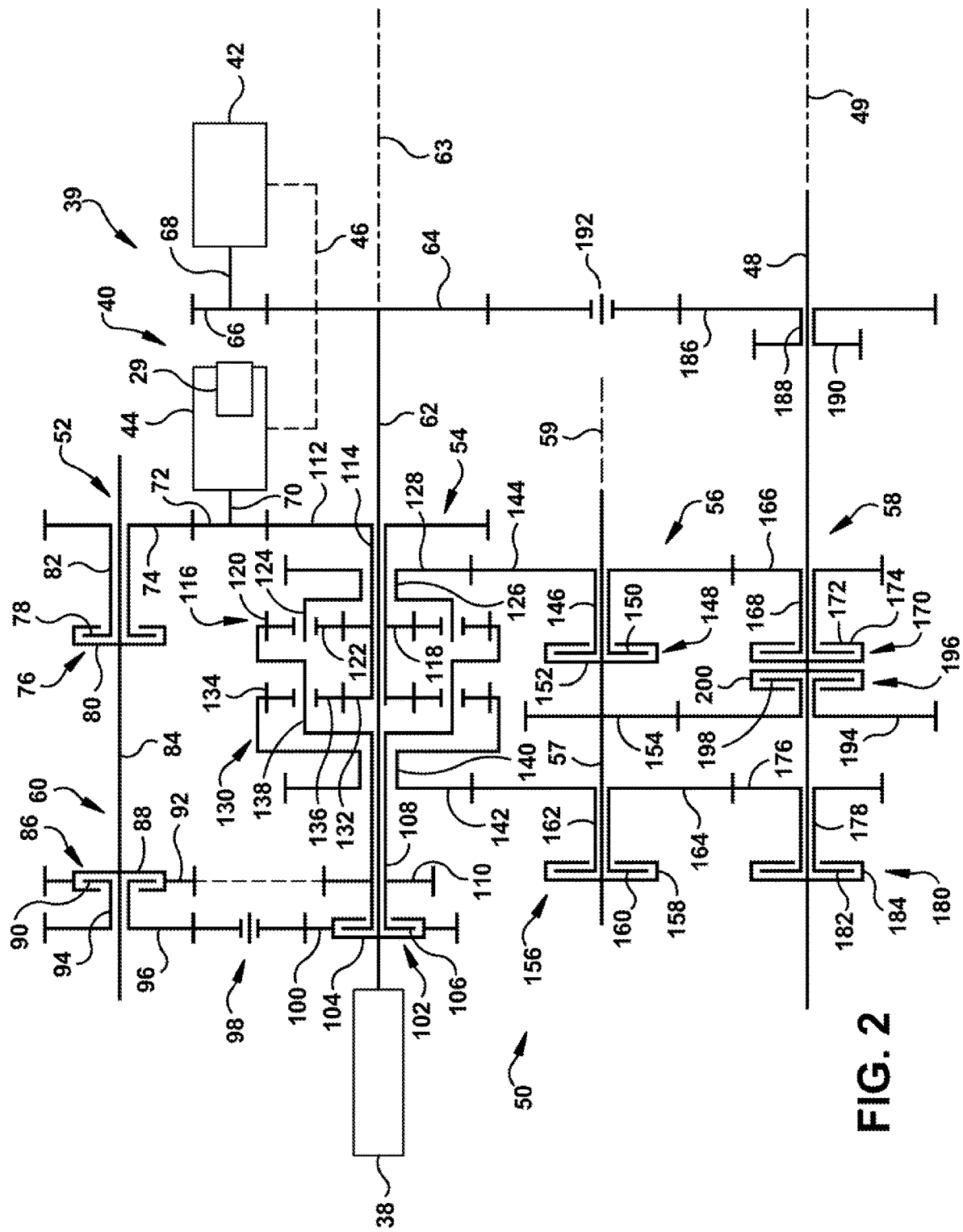
FIG. 2 is a schematic view of a multi-mode continuously variable transmission (CVT) of the work vehicle of FIG. 1 according to an example embodiment of the present disclosure.

Referring now to FIG. 2, an example configuration of the powertrain 14 is depicted schematically. The powertrain 14 may include an engine 38, which may be an internal combustion engine of various known configurations. The powertrain 14 may also include a primary power equipment unit 39 in the form of a continuously variable power source (CVP) 40. The CVP 40 may include at least one continuously variable machine (CVM), such as an electrical machine or a hydraulic machine. In the embodiment shown, the CVP 40 includes a first CVM 42 and a second CVM 44. As shown in FIG. 2, the first CVM 42 may be operably connected to the second CVM 44 via a conduit 46, such as one or more electrical wires or a fluid conduit. In an embodiment the first CVM 42 may be an electric generator operably connected to the second CVM 44 in the form of an electric motor via an electrical conduit 46, such as one or more electrical wires. In an example embodiment, a primary power equipment torque sensor 29 is provided for generating a primary power equipment torque signal representative of torque delivered to the transmission by the primary power equipment unit second CVM 44 provided in the form of an electric motor for example. In another embodiment the first CVM 42 may be a hydraulic pump operably connected to the second CVM 44 in the form of a hydraulic motor via a fluid conduit 46, such as one or more pipes. In an example embodiment, the primary power equipment torque sensor 29 is provided for generating the primary power equipment torque signal representative of torque delivered to the transmission by the primary power equipment unit second CVM 44 provided in the form of a hydraulic motor for example. In another embodiment the first CVM 42 may be a battery operably connected to the second CVM 44 in the form of an electric motor via an electrical conduit 46, such as one or more electrical wires. In an example embodiment, a primary power equipment torque sensor 29 is provided for generating a primary power equipment torque signal representative of torque delivered to the transmission by the primary power equipment unit second CVM 44 provided in the form of the electric motor for example.

The powertrain 14 may also include an output shaft 48 or other output member defining an output axis 49. The output shaft 48 may comprise or may be directly connected to one or more power sinks (e.g., one or both axles 16, power take-off ("PTO") shafts, and so on) of the vehicle 10. In certain embodiments, a torque converter or other device may be included between the engine 38 and the output shaft 48 (or another shaft (not shown)), although such a device is not necessary for the operation of the powertrain 14, as contemplated by this disclosure. Further, in certain embodiments, multiple shafts (not shown), including various shafts interconnected by various gears or other power transmission components, or equivalent power transmission components (e.g., chains, belts, and so on) may be included.

As noted above, the powertrain 14 may further include a transmission 50 for transferring power between the engine 38, the CVP 40, and the output shaft 48. The transmission 50 may include a plurality of components, such as shafts, gears, gearsets, clutches, brakes, and/or other components that interconnect the engine 38, the CVP 40, and the output shaft 48 as will be discussed in detail below. The transmission 50 may be considered a continuously variable or infinitely variable transmission. Also, the transmission 50 may be configured to provide selection between one of the plurality of transmission modes to vary the speeds and power flow paths.

Accordingly, the engine 38 may provide rotational power to the output shaft 48 via the transmission 50. The engine 38 may also provide rotational power to the first CVM 42 via the transmission 50. Continuing, the first CVM 42 may convert the received power to an alternate form (e.g., electrical or hydraulic power) for transmission over the conduit 46. This converted and transmitted power may be received by the second CVM 44 and then re-converted by the second CVM 44 to provide a rotational power output. Various known control devices (not shown) may be provided to regulate such conversion, transmission, re-conversion and so on.

In some embodiments, the first CVM 42 and the second CVM 44 are both electrical machines. Also, in some embodiments, the first and/or second CVMs 42, 44 may be configured to operate as a motor (to output mechanical power from electrical input power) and as a generator (to output electrical power from mechanical input power).

Generally, in some embodiments, the transmission 50 may include an input assembly 52 with an input shaft 62 to which the engine 38 is mounted and that defines an input or engine axis 63. In this example, the input assembly 52 may further include a further transmission shaft 84, spaced apart from the input shaft 62 and selectively coupled to the input shaft 62, as discussed in greater detail below. The input assembly 52 may include at least one component (an input transmission component) that is supported for rotation to facilitate transmission of power, as discussed below. As will be also discussed below, the engine 38 and the CVP 40 may be operatively connected to the input assembly 52.

The transmission 50 may also include a variator 54 at least partially mounted about the input shaft 62 such that, in this example, a central variator axis is coincident with the input axis 63. The variator 54 includes at least one component (a variator component) to facilitate transmission of power from the input assembly 52.

Thus, the variator 54 is operably connected to the engine 38 and the CVP 40. Generally, the variator 54 may include a variety of devices capable of summing the mechanical inputs from the engine 38 and the CVP 40 for a combined mechanical output to the output shaft 48 for split-path power transmission. In certain embodiments, as depicted in FIG. 2, the variator 54 may be configured as summing planetary gearsets (e.g., a double planetary gearset). It will be understood, however, that other configurations may be possible.

The transmission 50 may further include countershaft assembly 56 with a countershaft 57 defining a countershaft axis 59 and including at least one component (a countershaft component) that is supported for rotation to transfer power from the variator 54. Furthermore, the transmission 50 may include an output assembly 58 with the output shaft 48 and including at least one component (an output component) to transfer power from the countershaft assembly 56 to the output axis 49.

Accordingly, in some embodiments, the variator 54 may be disposed between, and operatively connected to, the input assembly 52 and the countershaft assembly 56. Also, the countershaft assembly 56 may be disposed between, and operatively connected to, the variator 54 and the output assembly 58. As such, the transmission 50 may be configured to enable power flow through the transmission 50 along a path from the input assembly 52, through the variator 54 and the countershaft assembly 56, and to the output assembly 58.

Generally, the transmission 50 may be configured as a multi-mode transmission and may provide selective shifting between the different modes. For example, the transmission 50 may provide one or more split-path power transmission modes. In each of these modes, power from the engine 38 and the CVP 40 may be combined or summed (e.g., by the variator 54), and the resulting combined/summed power may be delivered to the output shaft 48. In one split-path mode, the output shaft 48 may be rotated within a first speed range, and in another split-path mode, the output shaft 48 may be rotated within a second speed range. The second speed range may be higher than the first speed range in some embodiments. There may be additional split-path modes providing other speed ranges for the output shaft 48 as well.

Additionally, the transmission 50 may provide one or more CVP-only modes. For example, in some embodiments, the transmission 50 may, in a sense, disconnect the engine 38 from the output shaft 48 and instead deliver CVP power from the CVP 40 to the output shaft 48. In some embodiments, the speed range for the output shaft 48 during a CVP-only mode may be relatively low. For example, the transmission 50 may provide a CVP-only mode at which torque is maintained at the output shaft 48 while the output shaft 48 remains stationary (i.e., angular velocity of zero). This may be referred to as "powered zero". The output shaft 48 may be driven at relatively low speeds (i.e., "creeper speeds") as well in this CVP-only mode.

The transmission 50 may further include a control set 60 with a plurality of selective transmission components for selecting between the different transmission modes. The selective transmission components of the control set 60 may include wet clutches, dry clutches, dog collar clutches, brakes, or other similar components that may selectively move between an engaged position and a disengaged position. More specifically, a representative selective transmission component may include a first member and a second member that may engage each other (i.e., fixedly attach together for rotation as a unit) and, alternatively, disengage from each other (i.e., detach to allow relative rotation between the two). Although not shown, the control set 60 may be connected to a known control system for controlling actuation of the individual transmission components. Accordingly, as will be discussed further, the transmission 50 may provide effective power transmission across a number of modes such that the powertrain 14 is highly efficient.

Accordingly, the components of the transmission 50 in accordance with an example embodiment will now be discussed in detail according to the example embodiment. As shown, the engine 38 may be coupled to drive the input (or engine) shaft 62 that is supported for rotation about the input axis 63. A first gear 64 may be fixed for rotation on the input shaft 62 at an end opposite the engine 38. The first gear 64 may be enmeshed with a second gear 66. The second gear 66 may be fixed for rotation on a first CVM shaft 68 connected to the first CVM 42 for delivering mechanical power to the first CVM 42.

The second CVM 44 may be coupled to a second CVM shaft 70. The second CVM shaft 70 may be considered the output shaft of the second CVM 44 and may be driven in rotation about an axis that is spaced apart from and parallel to the input shaft 62, in this embodiment. A third gear 72 may be fixed for rotation on the second CVM shaft 70. The third gear 72 may be enmeshed with a fourth gear 74.

The transmission 50 may further include a first clutch 76 of the control set 60. The first clutch 76 may be referred to as a "creeper clutch" in some embodiments. The first clutch 76 may include at least one first member 78 and at least one second member 80 (e.g., first and second clutch plates). The first member 78 may be fixed for rotation with a first hollow shaft 82, which in turn supports the fourth gear 74. The second member 80 is fixed for rotation on the transmission shaft 84. The first hollow shaft 82, on which the first member 78 of the first clutch 76 is mounted, may surround and receive a portion of the transmission shaft 84, on which the second member 80 of the first clutch 76 is mounted.

The first clutch 76 may be configured to move between an engaged position in which the first and second members 78, 80 abut and engage, and a disengaged position in which the first and second members 78, 80 are separated from one another. For example, the first member 78 and the second member 80 engage together in the engaged position for rotation as a unit such that the second CVM shaft 70 of the second CVM 44 is rotationally coupled to transmission shaft 84 via the third gear 72, the fourth gear 74, and the first clutch 76. The first member 78 and the second member 80 may disconnect for independent rotation in the disengaged position to, in effect, cut off this power flow path.

The transmission 50 may additionally include a second clutch 86 of the control set 60. The second clutch 86 may be referred to as a "reverse clutch" in some embodiments. Like the first clutch 76, the second clutch 86 may include at least one first member 88 and at least one second member 90. The first member 88 of the second clutch 86 may be fixed to the transmission shaft 84 for mutual rotation. Moreover, a fifth gear 92 may be mounted to the first member 88 of the second clutch 86 for mutual rotation as a unit with the transmission shaft 84. The second member 90 may be fixed on an end of a second hollow shaft 94 that receives and circumscribes the transmission shaft 84. A sixth gear 96 is mounted on the second hollow shaft 94 on a side opposite the second member 90 of the second clutch 86.

As above, the second clutch 86 may be configured to move between an engaged position in which the first and second members 88, 90 abut and engage, and a disengaged position in which the first and second members 88, 90 are separated from one another. As such, the second clutch 86 may engage to allow power transmission between the transmission shaft 84 and the sixth gear 96. The first and second members 88, 90 may disengage to cut off this power flow.

The sixth gear 96 may be enmeshed with an idler gear 98. The idler gear 98, in turn, may be enmeshed with a seventh gear 100, as discussed below.

The transmission 50 may include a third clutch 102 of the control set 60. The third clutch 102 may be referred to as a "forward clutch" in some embodiments. Like the above-described clutches, the third clutch 102 may include at least one first member 104 and at least one second member 106. The first member 104 of the third clutch 102 may be fixed to the seventh gear 100 for rotation about the axis of the input shaft 62. The second member 106 may be fixed to an end of a third hollow shaft 108. The first member 104 and the second member 106 of the third clutch 102 may engage to allow power transmission between the seventh gear 100 and the third hollow shaft 108. The first and second members 104, 106 of the third clutch 102 may disengage to cut off this power transmission path.

Additionally, an eighth gear 110 may be fixed on the third hollow shaft 108. The eighth gear 110 may be enmeshed with the fifth gear 92. The third hollow shaft 108 generally circumscribes the input shaft 62 and includes a first end that forms the second member 106 of the third clutch 102 and a second end that is coupled to the variator 54, as described below.

The transmission 50 may include a ninth gear 112 that may be fixed on an end of a fourth hollow shaft 114. The hollow shaft 114 may receive the input shaft 62, and both the ninth gear 112 and the hollow shaft 114 may be supported for selective rotation as a unit relative to the input shaft 62. The ninth gear 112 may be enmeshed with the third gear 72 coupled to the second CVM 44. The fourth hollow shaft 114 may also be operatively attached to the variator 54 as will be discussed.

In this example, the variator 54 may include a double planetary gearset. However, it will be appreciated that the variator 54 may vary from the illustrated embodiment without departing from the scope of the present disclosure. Furthermore, it will be appreciated that the variator 54 may include a plurality of variator members, some of which may serve as power inputs and some of which may serve as power outputs, depending on the mode in which the transmission 50 is operating.

In the illustrated embodiment, for example, the variator 54 may include a first planetary gearset 116 (a low planetary gearset) having a first sun gear 118, a first ring gear 120, and a plurality of first planet gears 122 with an associated first carrier 124. The first sun gear 118 may be fixed to the shaft 114 for rotation about the variator (and input) axis 55. The first planet gears 122 may enmeshed with and disposed between the first sun gear 118 and the first ring gear 120. The first planet gears 122 and the first carrier 124 may be configured to rotate together about the variator (and input) axis 55.

In addition, the variator 54 may include a first output member formed by a hollow first output member shaft 126 and a tenth (or first output member) gear 128 mounted on the first output member shaft 126. The first output member shaft 126 receives the hollow shaft 114 and the input shaft 62 and is further fixed to the first carrier 124 for rotation therewith about the variator (and input) axis 55.

Moreover, the variator 54 may include a second planetary gearset 130 (a high planetary gearset) having a second sun gear 132, a second ring gear 134, and a plurality of second planet gears 136 with an associated second carrier 138. The second sun gear 132 may be fixed to the shaft 114 for rotation about the variator (and input) axis 55. The second planet gears 136 may be enmeshed with and disposed between the second sun gear 132 and the second ring gear 134. The second planet gears 136 and the second carrier 138 may be configured to rotate together about the variator (and input) axis 55. The second carrier 138 may also be attached to the first ring gear 120. Likewise, the second ring gear 134 may be centered on and supported for rotation about the variator (and input) axis 55. In some embodiments, the second carrier 138 may be fixed to the third hollow shaft 108. The opposite portion of the second carrier 138 may be fixed to the first ring gear 120.

The variator 54 may also include a second output member formed by short, hollow second output member shaft 140 and an eleventh (or second output member) gear 142 mounted on the second output member shaft 140. The second output member shaft 140 is hollow and receives the input shaft 62 and hollow shaft 108. The second output member shaft 140 may be fixed to the second ring gear 134 for rotation therewith about the variator (and input) axis 55. In some embodiments, the second output member gear 142 may be disposed axially between the second planetary gearset 130 and the third clutch 102 with respect to the variator (and input) axis 55.

It is noted that the first clutch 76, the second clutch 86, and the third clutch 102 may be disposed on an input side of the variator 54. Thus, during operation of the powertrain 14, power (from the engine 38 and/or the CVP 40) may be input to the variator 54 via one or more of these clutches 76, 86, 102. The variator 54 may output power via the components that are described below.

In this example, the transmission 50 may include a twelfth gear 144. The twelfth gear 144 may be supported for rotation about the countershaft axis 59. For example, the twelfth gear 144 may be fixed on an end of a hollow shaft 146, which is centered on the countershaft axis 59.

Additionally, the transmission 50 may include a fourth clutch 148 of the control set 60. The fourth clutch 148 may be referred to as a "first range clutch" in some embodiments. Like the above-described clutches, the fourth clutch 148 may include at least one first member 150 and at least one second member 152. The first member 150 may be fixed to the hollow shaft 146 for rotation about the countershaft axis 59, and the second member 152 may be fixed to the countershaft 57. The countershaft 57 may be received within the hollow shaft 146. The first member 150 of the fourth clutch 148 may engage the second member 152 to allow power transmission from the hollow shaft 146 to the countershaft 57. The first and second members 150, 152 may alternatively disengage to cut off this power transmission path.

The transmission 50 may further include a thirteenth gear 154. The thirteenth gear 154 may be referred to as a "drive gear" in some embodiments. The thirteenth gear 154 may be fixed to the countershaft 57 for rotation therewith about the countershaft axis 59.

Additionally, the transmission 50 may include a fifth clutch 156 of the control set 60. The fifth clutch 156 may be referred to as a "second range clutch" in some embodiments. Like the above-described clutches, the fifth clutch 156 may include at least one first member 158 and at least one second member 160. The first member 158 may be fixed to the countershaft 57 for rotation about the countershaft axis 59. The second member 160 may be fixed to an end of a hollow shaft 162. The second member 160 and the hollow shaft 162 may be supported for rotation about the countershaft axis 59. The first member 158 and the second member 160 of the fifth clutch 156 may engage to allow power transmission from the hollow shaft 162 to the countershaft 57. The first and second members 158, 160 may alternatively disengage to cut off this power transmission path.

The transmission 50 may further include a fourteenth gear 164. The fourteenth gear 164 may be fixed to the hollow shaft 162 on an end that is opposite that of the fifth clutch 156. The fourteenth gear 164 may also be engaged with the second output member gear 142.

Additionally, the transmission 50 may include a fifteenth gear 166. The fifteenth gear 166 may be enmeshed with the twelfth gear 144 and may be fixed to one end of a hollow shaft 168. The hollow shaft 168 may receive the output shaft 48. The hollow shaft 168 and the fifteenth gear 166 be centered on the output axis 49 and may be supported for rotation about the output axis 49.

Additionally, the transmission 50 may include a sixth clutch 170 of the control set 60. The sixth clutch 170 may be referred to as a "third range clutch" in some embodiments. Like the above-described clutches, the sixth clutch 170 may include at least one first member 172 and at least one second member 174. The first member 172 may be fixed to the hollow shaft 168 for rotation about the output axis 49. The second member 174 may be fixed to the output shaft 48. The first member 172 of the sixth clutch 170 may engage the second member 174 to allow power transmission from the hollow shaft 168 to the output shaft 48. The first and second members 172, 174 may alternatively disengage to cut off this power transmission path.

The transmission 50 may further include a sixteenth gear 176. The sixteenth gear 176 may be enmeshed with the fourteenth gear 164. The sixteenth gear 176 may also be fixed to a hollow shaft 178, which may be centered on the output axis 49 and which may be supported for rotation about the output axis 49. The hollow shaft 178 may receive the output shaft 48.

Additionally, the transmission 50 may include a seventh clutch 180 of the control set 60. The seventh clutch 180 may be referred to as a "fourth range clutch" in some embodiments. Like the above-described clutches, the seventh clutch 180 may include at least one first member 182 and at least one second member 184. The first member 182 may be fixed to the hollow shaft 178 for rotation about the output axis 49. The second member 184 may be fixed to the output shaft 48. The first member 182 and the second member 184 of the seventh clutch 180 may engage to allow power transmission from the hollow shaft 178 to the output shaft 48. The first and second members 182, 184 may alternatively disengage to cut off this power transmission path.

The transmission 50 may further include a seventeenth gear 186, a hollow shaft 188, and a eighteenth gear 190. The seventeenth gear 186 and the eighteenth gear 190 may be fixed on opposite ends of the hollow shaft 188. The hollow shaft 188 may receive the output shaft 48. The hollow shaft 188, the seventeenth gear 186, and the eighteenth gear 190 may be supported for rotation as a unit about the output axis 49. Also, the seventeenth gear 186 may be enmeshed with the first gear 64, directly or through a nineteenth (or idler) gear 192.

Although not shown, the eighteenth gear 190 may be enmeshed with a gear to drive a power sink, such as a power take-off (PTO) shaft. The eighteenth gear 190 may similarly be enmeshed with a gear to drive one or more power equipment units such as an electrical generator, a hydraulic pump, or the like for indirectly powering one or more consumers or power sinks for electric and/or hydraulic power off-boarding from the transmission 50 as may be necessary and/or desired.

Furthermore, the transmission 50 may include a twentieth gear 194. The twentieth gear 194 may be enmeshed with the thirteenth gear 154. The twentieth gear 194 may also be operatively attached to an eighth clutch 196. Like the above-described clutches, the eighth clutch 196 may include at least one first member 198 and at least one second member 200. The first member 198 may be fixed to the twentieth gear 194 (via a hollow shaft or otherwise). The first member 198 and the twentieth gear 194 may receive the output shaft 48 and may be supported for rotation about the output axis 49. The second member 200 may be fixed to the output shaft 48. The first member 198 and the second member 200 of the eighth clutch 196 may engage to allow power transmission from the twentieth gear 194 to the output shaft 48. The first and second members 198, 200 may alternatively disengage to cut off this power transmission path.

In some embodiments, the control set 60 of the transmission 50 may provide selection between at least two modes chosen from the following group: 1) an all-CVP creeper mode (including powered-zero); 2) a lower speed split-path field mode; and 3) a higher speed split-path field mode. Each of these may be forward modes for drivingly rotating the output shaft 48 in a forward direction (i.e., for moving the work vehicle 10 forward). The transmission 50 may also provide one or more reverse modes for drivingly rotating the output shaft 48 in a reverse (opposite direction) (i.e., for moving the work vehicle 10 in reverse).

In one example, the transmission 50 may provide the all-CVP creeper mode (i.e., series mode) when the first, fourth, and eighth clutches 76, 148, 196 are engaged and the second, third, fifth, sixth, and seventh clutches 86, 102, 156, 170, 180 are disengaged. Accordingly, engine power from the engine 38 may be transferred from the input shaft 62 to the first gear 64, to the second gear 66, and to the first CVM 42. The first CVM 42 in the form of an electric generator in an example embodiment may convert this mechanical input to electrical output for powering the second CVM 44 in the form of an electric motor in an example embodiment. Meanwhile, the second CVM 44 may drive the second CVM shaft 70 and power may be transferred from the third gear 72, to the fourth gear 74, through the first clutch 76, to the transmission shaft 84, across the first member 88 of the second clutch 86, to fifth gear 92, to eighth gear 110, to the shaft 108, through the second carrier 138, and to the first ring gear 120. In addition, CVM power at the third gear 72 may simultaneously transfer to the ninth gear 112, to the hollow shaft 114, and to the first sun gear 118. Accordingly, CVM power from the second CVM 44 may re-combine at the first planet gears 122 to drive the first output member shaft 126 and first output member gear 128. The first output member gear 128 may output this power through the twelfth gear 144, to the hollow shaft 146, through the fourth clutch 148, to the countershaft 57, to the thirteenth gear 154, to the twentieth gear 194, through the eighth clutch 196, and to the output shaft 48. Thus, this mode of the transmission 50 provides power from the CVP 40 to the output shaft 48 and also disconnects the engine 38 from the output shaft 48 (i.e., eliminates the direct mechanical connection of the engine 38 such that the engine 38 is merely powering the generator of the first CVM 42). Thus, in some embodiments, useful power may be provided by the CVP 50 but not by the engine 38 directly (except to the extent the engine drives the CVP 50). This is referred to as "CVP-only" power transmission or series mode.

The transmission 50 may provide a first split-path forward mode when the third, fourth, and eighth clutches 102, 148, 196 are engaged and the first, second, fifth, sixth, and seventh clutches 76, 86, 156, 170, 180 are disengaged. In this mode, engine power from the input shaft 62 may transfer through the third clutch 102, to shaft 108, to the second carrier 138, to drivingly rotate the first ring gear 120. Engine power may also drive the input shaft 62 and power may transfer to the first gear 64, to the second gear 66, to the first CVM shaft 68 in order to drive the first CVM 42. Electrical power may be generated for powering the second CVM 44. Mechanical power from the second CVM 44, via second CVM shaft 70) may drive the third gear 72, and this power may be transferred to the ninth gear 112, and to the shaft 114 in order to drive the first sun gear 118. The variator 54 may sum or combine the engine power (at the first ring gear 120) and the CVP power (at the first sun gear 118) and output combined power via the first planet gears 122 and associated first carrier 124 to drivingly rotate the first output member shaft 126 and first output member gear 128. The first output member gear 128 may transfer this power through the twelfth gear 144 to the hollow shaft 146, through the fourth clutch 148, to the countershaft 57, to the thirteenth gear 154, to the twentieth gear 194, through the eighth clutch 196, and to the output shaft 48. In some embodiments, the speed of the engine 38 may remain constant and the output speed of the second CVM 44 may vary in this mode.

The transmission 50 may additionally provide a second split-path forward mode when the third, fifth, and eighth clutches 102, 156, 196 are engaged and the first, second, fourth, sixth, and seventh clutches 76, 86, 148, 170, 180 are disengaged. In this mode, engine power from the input shaft 62 may transfer through the third clutch 102, to the shaft 108, and to the second carrier 138 in order to drivingly rotate the second planet gears 136. Engine power from input shaft 62 may also drive the first gear 64, and power may be transferred to the second gear 66, and to the first CVM shaft 68 in order to drive the first CVM 42. Electrical power may be generated for powering the second CVM 44. Mechanical power from the second CVM 44 (i.e., from the second CVM shaft 70) may drive the third gear 72, and this power may be transferred to the ninth gear 112, through the shaft 114, to drive the second sun gear 132. The variator 54 may sum or combine the engine power (at the second planet gears 136) and the CVP power (at the second sun gear 132) and output combined power via the second ring gear 134 to drivingly rotate the second output member shaft 140. The second output member shaft 140 may transfer this power through the second output member gear 142 to the fourteenth gear 164, through the fifth clutch 156, to the countershaft 57, to the thirteenth gear 154, to the twentieth gear 194, through the eighth clutch 196, and to the output shaft 48. In some embodiments, the speed of the engine 38 may remain constant and the output speed of the second CVM 44 may vary in this mode.

Furthermore, the transmission 50 may provide a third split-path forward mode when the third and sixth clutches 102, 170 are engaged and the first, second, fourth, fifth, seventh, and eighth clutches 76, 86, 148, 156, 180, 196 are disengaged. This mode may be substantially the same as the first split-path forward mode discussed above. The power flow path into the variator 54 may be the same, but the flow path out of the variator 54 may be different. Specifically, power at the first output member shaft 126 of the variator 54 may be transferred to the twelfth gear 144, to the fifteenth gear 166, to the hollow shaft 168, through the sixth clutch 170, and to the output shaft 48.

Moreover, the transmission 50 may provide a fourth split-path forward mode when the third and seventh clutches 102, 180 are engaged and the first, second, fourth, fifth, sixth, and eighth clutches 76, 86, 148, 156, 170, 196 are disengaged. This mode may be substantially the same as the second split-path forward mode discussed above. The power flow path into the variator 54 may be the same, but the flow path out of the variator 54 may be different. Specifically, power at the second output member shaft 140 and second output member gear 142 of the variator 54 may be transferred to the fourteenth gear 164, to the sixteenth gear 176, to the hollow shaft 178, through the seventh clutch 180, and to the output shaft 48.

Additionally, the transmission 50 may provide a plurality of reverse modes. In some embodiments, there may be a corresponding number of forward and reverse split-path modes. The control set 60 may provide the reverse modes similar to the forward modes discussed above, except that the second clutch 86 is engaged instead of the third clutch 102 in each. For example, a first split-path reverse mode may be provided when the second, fourth, and eighth clutches 86, 148, 196 are engaged and the first, third, fifth, sixth, and seventh clutches 76, 102, 156, 170, 180 are disengaged. Accordingly, engine power from the input shaft 62 may transfer through the seventh gear 100, to the idler gear 98, to the sixth gear 96, to the shaft 94, through the second clutch 86, through fifth gear 92, to the shaft 108, and to the second carrier 138 in order to drivingly rotate the first ring gear 120. Engine power may also drive the input shaft 62, and power may be transferred to the first gear 64, and to the first CVM shaft 68 in order to drive the first CVM 42. Electrical power may be generated for powering the second CVM 44. Mechanical power from the second CVM 44 (i.e., from the second CVM shaft 70) may drive the third gear 72, and this power may be transferred to the ninth gear 112, through the shaft 114, to drive the first sun gear 118. As discussed above, the variator 54 may output combined power via the first planet gears 122 and associated first carrier 124 to drivingly rotate the first output member shaft 126. The first output member shaft 126 may transfer this power through the twelfth gear 144, through the fourth clutch 148, to the countershaft 57, to the thirteenth gear 154, to the twentieth gear 194, through the eighth clutch 196, and to the output shaft 48. The other reverse modes may be provided in a similar fashion.

Thus, the transmission 50 provides a plurality of modes that may be useful in different conditions. The operator may select between these different modes and/or the transmission 50 may automatically shift between these modes to maintain high operating efficiency in a number of different operating conditions.

As described above, the overload protection system 12 operates to monitor the torque within the powertrain 14 and generate torque values associated with one or more components of the transmission 50 and powertrain 14, including the input shaft 62, the output shaft 48, and various other components (e.g., gears, bearings, etc.) within the transmission 50. In one example, the overload protection system 12 generates the torque usage and other information at least partially as a function of the commanded torque at the second CVM 44, as will be described in greater detail below.

Figure 3:
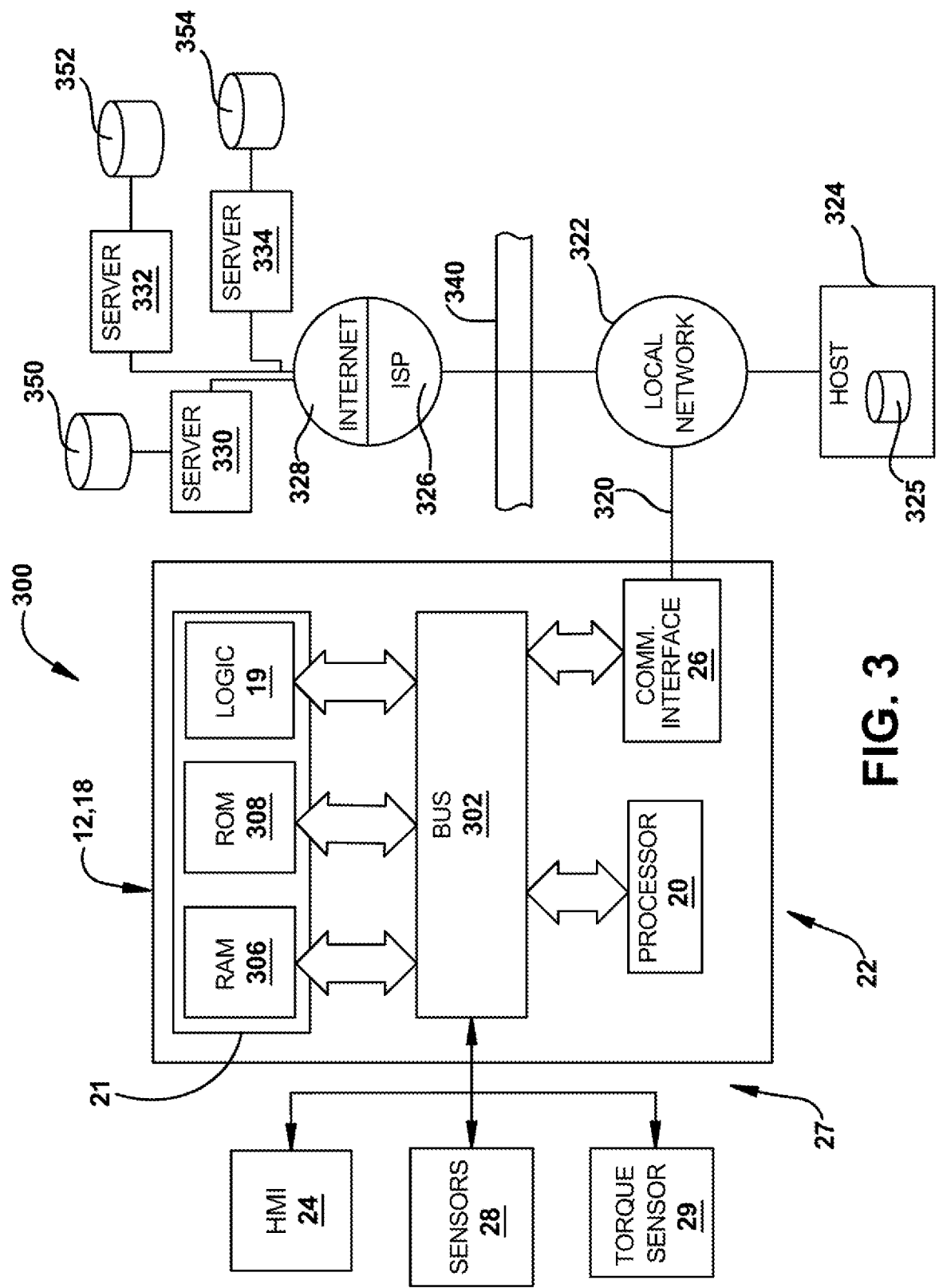
FIG. 3 is a block diagram that illustrates an overload protection system controller of an overload protection system suitable for executing embodiments of one or more software systems or modules that are executable to control torque delivered to a transmission by a power equipment unit of a working vehicle according to an example embodiment of the present disclosure.

FIG. 3 is a block diagram that illustrates a computer system 300 combining the vehicle control system 18 and the overload protection system 12 suitable for executing embodiments of one or more software systems or modules that are executable to control the work vehicle and also to control torque delivered to a transmission by a power equipment unit of a working vehicle according to an example embodiment of the present disclosure. The example computer system 300 of the embodiment includes a bus 302 or other communication mechanism for communicating information, and a processor 20 coupled with the bus for processing information. The computer system includes a main memory 21, such as including random access memory (RAM) 306 or other dynamic storage devices for storing information and instructions 19 to be executed by the processor 20, and read only memory (ROM) 308 or other static storage device for storing static information and instructions 19 for the processor 20. The main memory may be a non-volatile memory device for example operable to store information and instructions executable by the processor 20.

The example embodiments described herein are related to the use of the computer system 300 for receiving a torque output signal from a power equipment torque sensor and to limit a magnitude of an engine torque setpoint signal based on the primary power equipment torque signal to control torque delivered to the transmission by the primary power equipment unit to less than the torque design value. Further, the embodiments described herein are related to the use of computer system 300 for accessing information from the multiple sources in selective combination with internal proprietary data such as driver sensitive data, harvest records, travel data, weather data, and the like from within a firewall 340. According to one implementation, information from the multiple remote public, commercial, and/or internal proprietary resources is provided by computer system 300 in response to the processor 20 executing one or more sequences of one or more instructions contained in main memory device 21. Such instructions may be read into main memory device 21 from another computer-readable medium, such as a storage device including for example a memory card. Execution of the sequences of instructions contained in main memory device 21 causes the processor 20 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 20 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The vehicle operation and overload protection computer system 300 may also include a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn may provide data communication services through the Internet 328. Local network 322 and Internet 328 may both use electric, electromagnetic or optical signals that carry digital data streams. The signals through the various networks and the signals on network link 320 and through communication interface 318, which carry the digital data to and from the overload protection system controller 300, are exemplary forms of carrier waves transporting the information.

The computer system 300 can send messages and receive data, including program code, through the network(s), network link 320 and communication interface 318. In an Internet-connected example embodiment, the computer system 300 is operatively connected with a plurality of external public, private, governmental or commercial servers (not shown) such as one or more wireless services configured to execute a web application in accordance with the example embodiment. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The overload protection system controller 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed and executed by the processor 20 as it is received, and/or stored in storage device 310, or other non-volatile storage for later processing or data manipulation.

The vehicle control and overload protection computer system 300 suitably includes several subsystems or modules to perform the overload protection and prevention management as set forth herein. A primary purpose of the subject application is to provide an improved system that allows a user to control the draw force of a tractor pulling an implement to within a desired band, span or limit, while permitting engine operation in a range above a rated power of the engine without damaging the drivetrain including axles and transmission components by limiting the amount of torque delivered to the drivetrain and also while off-boarding amounts of auxiliary power as may be required by the one or more cooperative implements attached to the tractor.

FIG. 4 is a schematic illustration of an overload protection system 12 in a work vehicle in accordance with an example embodiment. In the example, the overload protection system 12 is arranged in a configuration 400 wherein the transmission 50 is used in a "split-path" power transmission mode in which power such as, for example, tractive power via the output shaft 48, from both the engine 38 and a primary power equipment unit 39, in the form in the example of a CVP 40, is combined for delivery of useful power to the output member 48. This is called "split-path" power transmission because it is split between a direct mechanical path from the engine 38 and an infinitely/continuously variable path through one or more CVPs 40 and, in particular, through the primary power equipment unit 39 CVP. In the example embodiment of the configuration 400, the transmission 50 is positioned operatively between the output shaft 48 and the engine 38 and also between the at least one primary power equipment unit 39 in the form in the example of a CVP 40 such that the output shaft 48 selectively receives power from one or both of the engine 38 and/or the at least one primary power equipment unit 39 in the form in the example of a CVP 40 to drive the output shaft 48.

In addition, in the configuration 400 shown, the transmission may supply power to one or more other power consumers such as for example to a set 410 of other hydraulic, mechanical, and/or electric power equipment unit power sources on the working vehicle and/or to other mounting devices such as a three-point power lifts, hoists. For example the engine 38 may supply power via the transmission 50 to a hydraulic power equipment unit power source 420 for off-boarding hydraulic power from the work vehicle 10 for powering various hydraulic equipment such as for example power take off mechanisms and the like and/or other product or ground handling and processing mechanisms. The engine 38 may further supply power via the transmission 50 to a mechanical power equipment unit power source 430 for off-boarding mechanical power from the work vehicle 10 for energizing various mechanical apparatus and systems such as mechanical power take off mechanisms and/or other product or ground handling and processing mechanisms. In further addition, the engine 38 may further supply power via the transmission 50 to an electrical power equipment unit power source 440 for off-boarding electrical power from the work vehicle 10 for various electric apparatus and systems such as motors powering various mechanisms and/or other product or ground handling and processing systems.

As described above relative to overcoming problems associated with towing force regulation using "power boost" or IPM, the engine 38 of the work vehicle may be operated above a rated power of the engine when it is determined that selected load paradigms are present. For example, the tractor may enter into IPM when one or more of the additional loads 420, 430, 440 are engaged for servicing by the engine 38 when the work vehicle is in motion. The overload protection system 12 of the example embodiment may sense the extra loading from the additional loads 420, 430, 440 using a corresponding set of particular load sensors 422, 432, 442 of the sensors 28 described above, for example. The use of IPM is effective for providing power to any number of auxiliary power consuming devices and systems on the work vehicle such as for example the hydraulic, mechanical, and/or electric power equipment unit power sources 420, 430, 440 illustrated for use in field applications and that are driven by the tractor engine 38. In order to limit the amount of power delivered to the transmission 50 by virtue of the increased engine operation while in the boost mode in order to avoid possible damage of drivetrain components of the primary power equipment unit driven by the boosted engine and in turn driving the transmission, the embodiments described herein regulate the delivery of torque to the transmission within the design limits of the drivetrain and its associated components.

In accordance with an example embodiment, the configuration 400 of FIG. 4 disposed in a work vehicle 10 includes a primary power equipment unit 39, an engine 38 operable to deliver power to the primary power equipment unit 39 in response to an engine setpoint signal 450, an output shaft 48, a transmission 50 positioned between the output shaft 48 and the primary power equipment unit 39 such that the output shaft 48 receives power from the primary power equipment unit 39 to drive the output shaft 48, and an overload protection system 12 controlling torque 464 delivered to the transmission 50 by the primary power equipment unit 39. In the example embodiment, the engine setpoint signal 450 is an engine torque setpoint signal for controlling an amount of torque produced by the engine. In addition, the overload protection system 12 of the example embodiment includes a primary power equipment torque sensor 29 in operative communication with the primary power equipment unit 39, and an overload protection system controller 22. In the example embodiment, the primary power equipment torque sensor 29 generates a primary power equipment torque signal 452 representative of torque 464 delivered to the transmission 50 by the primary power equipment unit 39. Further in the example embodiment, the overload protection system controller 22 includes a processor 20 (FIGS. 1 and 2), an input 27 operatively coupled with the processor 20 and receiving the primary power equipment torque signal 452, a non-transient memory device 21 operatively coupled with the processor 20, and overload protection logic 19 stored in the memory device 21. The overload protection logic 19 is executable by the processor 20 to limit a magnitude of the engine torque setpoint signal 450 based on the primary power equipment torque signal 452 to control the torque 464 delivered to the transmission 50 by the primary power equipment unit 39 to less than a predetermined level or value. In accordance with an embodiment, preferably, the overload protection logic 19 is executable by the processor 20 to limit a magnitude of the engine setpoint signal 450 based on the primary power equipment torque signal 452 to control the torque 464 delivered to the transmission 50 by the primary power equipment unit 39 to less than a torque design value of the transmission and its components including for example the drivetrain 14.

FIG. 5 is a schematic illustration of an overload protection system 12 in a work vehicle in accordance with a further example embodiment. In the example shown, the overload protection system 12 is arranged in a configuration 500 wherein the transmission 50 is used in a "CVP-only" power transmission or series mode wherein useful power such as, for example, tractive power via the output shaft 48, is provided by a primary power equipment unit 39 in the form in the example of a CVP 40 but not by the engine (except to the extent the engine drives the CVP 40). In the example embodiment of the configuration 500, the transmission 50 is positioned operatively between the output shaft 48 and the engine 38 and the at least one primary power equipment unit 39 in the form in the example of a CVP 40 such that the primary power equipment unit 39 receives power from the engine and the output shaft 48 receives power from the primary power equipment unit 39 in the form in the example of a CVP 40 to drive the output shaft 48.

In addition, in the configuration 500 shown, the transmission may supply power to one or more other power consumers such as for example to a set 510 of other hydraulic, mechanical, and/or electric power equipment unit power sources on the working vehicle and/or to other mounting devices such as a three-point power lifts, hoists. For example the engine 38 may supply power via the transmission 50 to a hydraulic power equipment unit power source 520 for off-boarding hydraulic power from the work vehicle 10 for powering various hydraulic equipment such as power take off mechanisms and other handling and processing mechanisms. The engine 38 may further supply power via the transmission 50 to a mechanical power equipment unit power source 530 for off-boarding mechanical power from the work vehicle 10 for various mechanical apparatus and systems such as power take off mechanisms and other handling and processing mechanisms. In further addition, the engine 38 may further supply power via the transmission 50 to an electrical power equipment unit power source 540 for off-boarding electrical power from the work vehicle 10 for various electric apparatus and systems such as motors powering various mechanisms and other handling and processing systems.

As described above relative to overcoming problems associated with towing force regulation using "power boost" or IPM, the engine 38 of the work vehicle may be operated above a rated power of the engine when it is determined that selected load paradigms are present. For example, the tractor may enter into IPM when one or more of the additional loads 520, 530, 540 are engaged for servicing by the engine 38. The overload protection system 12 of the example embodiment may sense the loading from the additional loads 520, 530, 540 using a corresponding set of load sensors 522, 532, 542, for example. The use of IPM is effective for providing power to any number of auxiliary power consuming devices and systems on the work vehicle such as for example the hydraulic, mechanical, and/or electric power equipment unit power sources 520, 530, 540 illustrated for use in field applications and that are driven by the tractor engine 38. In order to limit the amount of power delivered to the transmission 50 by virtue of the increased engine operation while in the boost mode in order to avoid possible damage of drivetrain components of the primary power equipment unit driven by the boosted engine and in turn driving the transmission, the embodiments described herein regulate the delivery of torque to the transmission within the design limits of the drivetrain and its associated components.

In accordance with an example embodiment, the configuration 500 of FIG. 5 disposed in a work vehicle 10 includes a primary power equipment unit 39, an engine 38 operable to deliver power to the primary power equipment unit 39 in response to an engine torque setpoint signal 550, an output shaft 48, a transmission 50 positioned between the output shaft 48 and the primary power equipment unit 39 such that the output shaft 48 receives power from the primary power equipment unit 39 to drive the output shaft 48, and an overload protection system 12 controlling torque 564 delivered to the transmission 50 by the primary power equipment unit 39. In the example embodiment, the overload protection system 12 includes a primary power equipment torque sensor 29 in operative communication with the primary power equipment unit 39, and an overload protection system controller 22. In the example embodiment, the primary power equipment torque sensor 29 generates a primary power equipment torque signal 552 representative of torque 564 delivered to the transmission 50 by the primary power equipment unit 39. Further in the example embodiment, the overload protection system controller 22 includes a processor 20 (FIGS. 1 and 2), an input 27 operatively coupled with the processor 20 and receiving the primary power equipment torque signal 552, a non-transient memory device 21 operatively coupled with the processor 20, and overload protection logic 19 stored in the memory device 21. The overload protection logic 19 is executable by the processor 20 to limit a magnitude of the engine torque setpoint signal 550 based on the primary power equipment torque signal 552 to control the torque 564 delivered to the transmission 50 by the primary power equipment unit 39 to less than a predetermined level or value. In accordance with an embodiment, preferably, the overload protection logic 19 is executable by the processor 20 to limit a magnitude of the engine torque setpoint signal 550 based on the primary power equipment torque signal 552 to control the torque 564 delivered to the transmission 50 by the primary power equipment unit 39 to less than a torque design value of the transmission and its components including for example the drivetrain 14.

Figure 6:
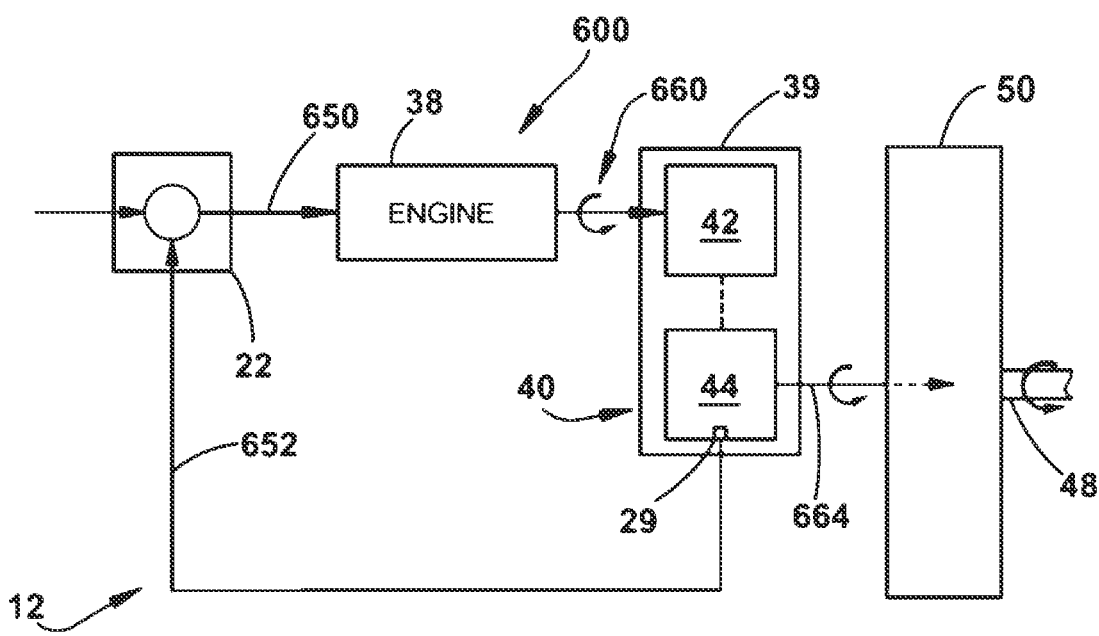
FIG. 6 is a schematic illustration of an overload protection system in a work vehicle arranged in a configuration wherein a primary power equipment unit is driven directly by an engine and wherein the primary power equipment unit in turn drives a transmission for driving an output shaft in accordance with an example embodiment.

FIG. 6 is a schematic illustration of an overload protection system 12 in a work vehicle in accordance with yet a further example embodiment. In the example, the overload protection system 12 is arranged in a configuration 600 wherein a primary power equipment unit 39 in the form in the example of a CVP 40 is driven directly by the engine 38 and wherein the primary power equipment unit 39 in turn drives the transmission 50 for driving the output shaft 48 which may be an axle shaft or any other one or more components of the transmission 14 of the work vehicle 10. This configuration is somewhat equivalent to the configuration 500 (FIG. 5) described above in that useful power such as for example tractive power in the relevant application is not directly provided by the engine (except to the extent the engine drives the CVP 40), but instead by the primary power equipment unit 39. In the example embodiment of the configuration 600, the primary power equipment unit 39 is positioned operatively between the engine 38 and the transmission 50 such that the primary power equipment unit 39 receives power directly from the engine 38 and the output shaft 48 receives power from the transmission 50 via the primary power equipment unit 39 in the form in the example of a CVP 40 to drive the output shaft 48.

As described above relative to overcoming problems associated with towing force regulation using "power boost" or IPM, the engine 38 of the work vehicle may be operated above a rated power of the engine when it is determined that selected load paradigms are present. For example, the tractor may enter into IPM in the case of intensely inhomogeneous or particularly moist ground owing to a particularly large resistance force on the working device while powering the one or more hydraulic, mechanical, and/or electric power equipment unit power sources driving the working implements operable complimentary to the work vehicle in cooperative field applications. The overload protection system 12 of the example embodiment may sense the additional loading via a torque sensor 29. The use of IPM is also effective for providing power to any number of auxiliary power consuming devices and systems on the work vehicle such as for example hydraulic, mechanical, and/or electric power equipment unit power sources for use in field applications and that are driven by the tractor engine 38. In order to limit the amount of power delivered to the transmission 50 by virtue of the increased engine operation while in the boost mode to best avoid possible damage of drivetrain components of the primary power equipment unit driven by the boosted engine and in turn driving the transmission, the embodiments described herein regulate the delivery of torque to the transmission within the design limits of the drivetrain and its associated components.

In accordance with an example embodiment, the configuration 600 of FIG. 6 disposed in a work vehicle 10 includes a primary power equipment unit 39, an engine 38 operable to deliver power to the primary power equipment unit 39 in response to an engine torque setpoint signal 650, an output shaft 48, a transmission 50 positioned between the output shaft 48 and the primary power equipment unit 39 such that the output shaft 48 receives power from the primary power equipment unit 39 to drive the output shaft 48, and an overload protection system 12 controlling torque 664 delivered to the transmission 50 by the primary power equipment unit 39. In the example embodiment, the overload protection system 12 includes a primary power equipment torque sensor 29 in operative communication with the primary power equipment unit 39, and an overload protection system controller 22. In the example embodiment, the primary power equipment torque sensor 29 generates a primary power equipment torque signal 652 representative of torque 664 delivered to the transmission 50 by the primary power equipment unit 39. Further in the example embodiment, the overload protection system controller 22 includes a processor 20 (FIGS. 1 and 2), an input 27 operatively coupled with the processor 20 and receiving the primary power equipment torque signal 652, a non-transient memory device 21 operatively coupled with the processor 20, and overload protection logic 19 stored in the memory device 21. The overload protection logic 19 is executable by the processor 20 to limit a magnitude of the engine torque setpoint signal 650 based on the primary power equipment torque signal 652 to control the torque 664 delivered to the transmission 50 by the primary power equipment unit 39 to less than a predetermined level or value. In accordance with an embodiment, preferably, the overload protection logic 19 is executable by the processor 20 to limit a magnitude of the engine torque setpoint signal 650 based on the primary power equipment torque signal 652 to control the torque 664 delivered to the transmission 50 by the primary power equipment unit 39 to less than a torque design value of the transmission and its components including for example the drivetrain 14.

Figure 7:
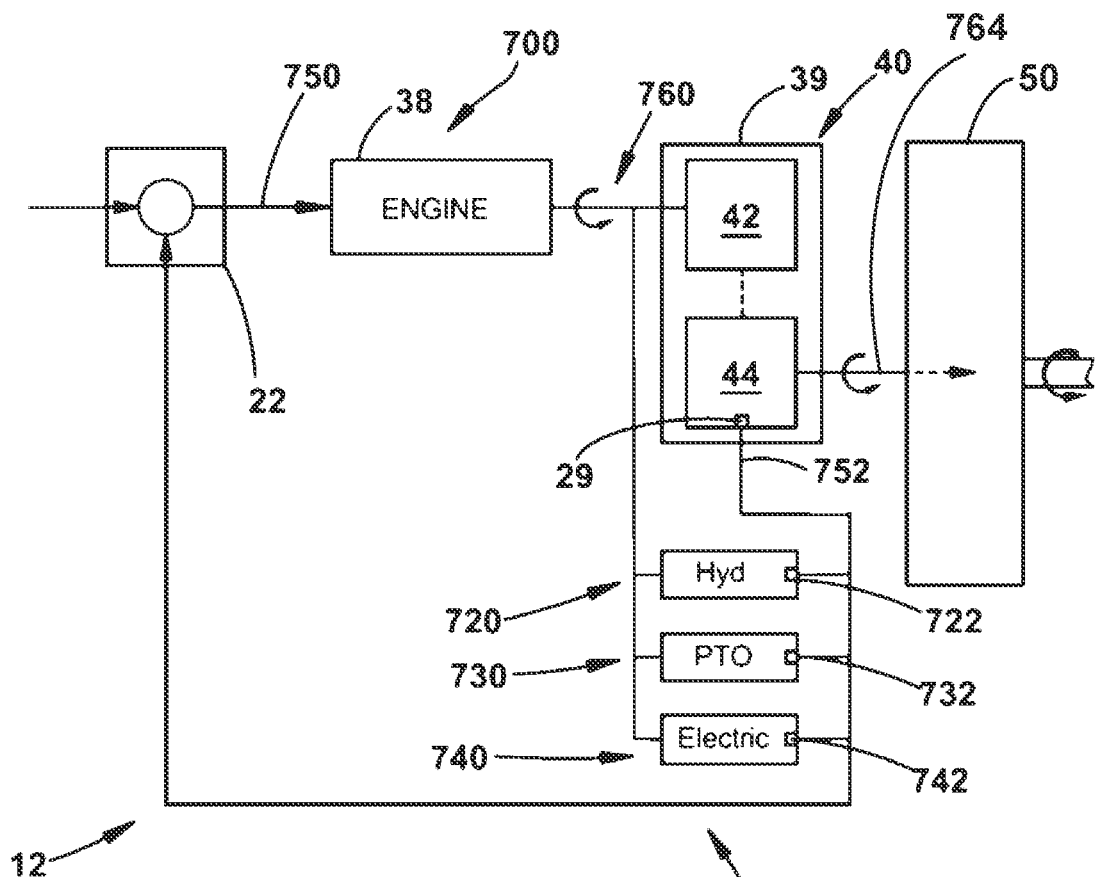
FIG. 7 is a schematic illustration of an overload protection system in a work vehicle arranged in a configuration wherein a primary power equipment unit is driven directly by an engine and wherein the primary power equipment unit in turn drives a transmission for driving an output shaft and wherein the engine further drives additional auxiliary power consuming devices in accordance with an example embodiment.

FIG. 7 is a schematic illustration of an overload protection system 12 in a work vehicle in accordance with an example embodiment. In the example, the overload protection system 12 is arranged in a configuration 700 wherein a primary power equipment unit 39 in the form in the example of a CVP 40 is driven directly by the engine 38 and wherein the primary power equipment unit 39 in turn drives the transmission 50 for driving the output shaft 48 which may be an axle shaft or any other one or more components of the transmission 14 of the work vehicle 10. This configuration is also somewhat equivalent to the configuration 500 (FIG. 5) described above in that useful power such as for example tractive power in the relevant application is not directly provided by the engine (except to the extent the engine drives the CVP 40), but instead by the primary power equipment unit 39. In the example embodiment of the configuration 600, the primary power equipment unit 39 is positioned operatively between the engine 38 and the transmission 50 such that the primary power equipment unit 39 receives power directly from the engine 38 and the output shaft 48 receives power from the transmission 50 via the primary power equipment unit 39 in the form in the example of a CVP 40 to drive the output shaft 48.

In addition, in the configuration 700 shown, the engine 38 may supply power directly to one or more other power consumers such as for example to a set 710 of other hydraulic, mechanical, and/or electric power equipment unit power sources on the working vehicle and/or to other mounting devices such as a three-point power lifts, hoists. For example the engine 38 may supply power to a hydraulic power equipment unit power source 720 for off-boarding hydraulic power from the work vehicle 10 for powering various hydraulic equipment such as power take off mechanisms and other handling and processing mechanisms. The engine 38 may further supply power to a mechanical power equipment unit power source 730 for off-boarding mechanical power from the work vehicle 10 for various mechanical apparatus and systems such as power take off mechanisms and other handling and processing mechanisms. In further addition, the engine 38 may further supply power to an electrical power equipment unit power source 740 for off-boarding electrical power from the work vehicle 10 for various electric apparatus and systems such as motors powering various mechanisms and other handling and processing systems.

As described above relative to overcoming problems associated with towing force regulation using "power boost" or IPM, the engine 38 of the work vehicle may be operated above a rated power of the engine when it is determined that selected load paradigms are present. For example, the tractor may enter into IPM when one or more of the additional loads 720, 730, 740 are engaged for servicing by the engine 38. The overload protection system 12 of the example embodiment may sense the loading from the additional loads 720, 730, 740 using a corresponding set of load sensors 722, 732, 742, for example. The use of IPM is effective for providing power to any number of auxiliary power consuming devices and systems on the work vehicle such as for example the hydraulic, mechanical, and/or electric power equipment unit power sources 720, 730, 740 illustrated for use in field applications and that are driven by the tractor engine 38. In order to limit the amount of power delivered to the transmission 50 by virtue of the increased engine operation while in the boost mode in order to avoid possible damage of drivetrain components of the primary power equipment unit driven by the boosted engine and in turn driving the transmission, the embodiments described herein regulate the delivery of torque to the transmission within the design limits of the drivetrain and its associated components.

In accordance with an example embodiment, the configuration 700 of FIG. 7 disposed in a work vehicle 10 includes a primary power equipment unit 39, an engine 38 operable to deliver power to the primary power equipment unit 39 in response to an engine torque setpoint signal 750, an output shaft 48, a transmission 50 positioned between the output shaft 48 and the primary power equipment unit 39 such that the output shaft 48 receives power from the primary power equipment unit 39 to drive the output shaft 48, and an overload protection system 12 controlling torque 764 delivered to the transmission 50 by the primary power equipment unit 39. In the example embodiment, the overload protection system 12 includes a primary power equipment torque sensor 29 in operative communication with the primary power equipment unit 39, and an overload protection system controller 22. In the example embodiment, the primary power equipment torque sensor 29 generates a primary power equipment torque signal 752 representative of torque 764 delivered to the transmission 50 by the primary power equipment unit 39. Further in the example embodiment, the overload protection system controller 22 includes a processor 20 (FIGS. 1 and 2), an input 27 operatively coupled with the processor 20 and receiving the primary power equipment torque signal 752, a non-transient memory device 21 operatively coupled with the processor 20, and overload protection logic 19 stored in the memory device 21. The overload protection logic 19 is executable by the processor 20 to limit a magnitude of the engine torque setpoint signal 750 based on the primary power equipment torque signal 752 to control the torque 764 delivered to the transmission 50 by the primary power equipment unit 39 to less than a predetermined level or value. In accordance with an embodiment, preferably, the overload protection logic 19 is executable by the processor 20 to limit a magnitude of the engine torque setpoint signal 750 based on the primary power equipment torque signal 752 to control the torque 764 delivered to the transmission 50 by the primary power equipment unit 39 to less than a torque design value of the transmission and its components including for example the drivetrain 14.

It is to be understood that other embodiments will be utilized and structural and functional changes will be made without departing from the scope of the present invention. The foregoing descriptions of example embodiments of the present invention of the claims have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A work vehicle comprising:
a primary power equipment unit;
an engine operable to deliver power to the primary power equipment unit in response to an engine setpoint signal;
an output member;
a transmission operably coupling the output member with the primary power equipment unit such that the output member receives power from the primary power equipment unit to drive the output member; and
an overload protection system controlling torque delivered to the transmission by the primary power equipment unit, the overload protection system comprising:
a primary power equipment torque sensor in operative communication with the primary power equipment unit, the primary power equipment torque sensor generating a primary power equipment torque signal representative of torque delivered to the transmission by the primary power equipment unit; and
an overload protection system controller comprising:
a processor;
an input operatively coupled with the processor and receiving the primary power equipment torque signal;
a non-transient memory device operatively coupled with the processor; and
overload protection logic stored in the memory device, the overload protection logic being executable by the processor to:
limit a magnitude of the engine setpoint signal based on the primary power equipment torque signal to control the torque delivered to the transmission by the primary power equipment unit to less than a torque design value.

2. The work vehicle according to claim 1, wherein:
the engine is selectively operable in a first mode to deliver rated power to the primary power equipment unit for a predetermined first work application of the work vehicle;
the engine is selectively operable in a power boost mode to deliver boost power greater than the rated power to the primary power equipment unit for a predetermined second work application of the work vehicle; and
the overload protection logic is executable by the processor to limit the magnitude of the engine setpoint signal to control the torque delivered to the transmission by the primary power equipment unit for the engine operating in the power boost mode to less than the torque design value.

3. The work vehicle according to claim 2, wherein:
the primary power equipment unit comprises a continuously variable power source;
the output member comprises a drive axle of the work vehicle;
the transmission comprises a split path transmission; and
the engine is selectively operable in the power boost mode to deliver the boost power to the continuously variable power source for accelerating or decelerating the work vehicle in a transport application of the work vehicle as the second work application.

4. The work vehicle according to claim 2, wherein:
the engine is selectively operable in the power boost mode to deliver the boost power for a predetermined third work application of the work vehicle to a combination of the primary power equipment unit and an associated secondary power equipment unit operatively coupled with the work vehicle;
the primary power equipment unit comprises a continuously variable power source;
the associated secondary power equipment unit comprises a power take off (PTO) device operatively coupled with the transmission;
the output member comprises a drive axle of the work vehicle;
the transmission comprises a split path transmission; and
the engine is selectively operable in the power boost mode to deliver the boost power to the power take off device for powering an associated driven working implement operable complimentary to the work vehicle in a joint working application of the work vehicle as the third work application.

5. The work vehicle according to claim 2, wherein:
the engine is selectively operable in the power boost mode to deliver the boost power for a predetermined third work application of the work vehicle to a combination of the primary power equipment unit and a plurality of associated secondary power equipment units operatively coupled with the work vehicle;
the primary power equipment unit comprises a continuously variable power source;
the plurality of associated secondary power equipment units comprise one or more of:
a power take off device operatively coupled with the transmission;
a hydraulic pump device operatively coupled with the engine; and/or
an electric generator operatively coupled with the engine;
the output member comprises a drive axle of the work vehicle;
the transmission comprises a split path transmission; and
the engine is selectively operable in the power boost mode to deliver the boost power to the plurality of associated secondary power equipment units for powering a plurality of associated driven working implements operable complimentary to the work vehicle in a joint working application of the work vehicle as the third work application.

6. The work vehicle according to claim 1, wherein:
the transmission is positioned operatively between the output member and the engine and the primary power equipment unit such that the output member selectively receives power from one or both of the engine and/or the primary power equipment unit to drive the output member.

7. The work vehicle according to claim 1, wherein:
the engine setpoint signal comprises an engine torque setpoint signal;
the engine is operable to deliver torque power to the primary power equipment unit in response to the engine torque setpoint signal;
the overload protection logic is executable by the processor to limit the magnitude of the engine torque setpoint signal based on the primary power equipment torque signal to control the torque delivered to the transmission by the primary power equipment unit to less than the torque design value.

8. The work vehicle according to claim 1, wherein:
the transmission comprises a split path transmission operable to couple the output member with the primary power equipment unit and the engine such that the output member receives power from a combination of the primary power equipment unit and the engine;
the primary power equipment torque sensor is operable to generate a torque signal representative of torque delivered to the transmission by the combination of the primary power equipment unit and the engine; and
the overload protection logic is executable by the processor to limit the magnitude of the engine setpoint signal based on the torque signal to control the torque delivered to the transmission by the combination of the primary power equipment unit and the engine to less than the torque design value.

9. An overload protection system controlling torque delivered to a transmission of an associated work vehicle including a primary power equipment unit coupled with the transmission and operable in response to a commanded torque to deliver power to the transmission, and an engine operable in response to an engine setpoint signal to deliver power to one or both of the transmission and/or the primary power equipment unit, the overload protection system comprising:
an overload protection system controller comprising:
a processor;
a non-transient memory device operatively coupled with the processor; and
overload protection logic stored in the memory device, the overload protection logic being executable by the processor to:
determine a transmission torque applied to one or more components of the transmission based on the commanded torque of the primary power equipment unit; and
limit a magnitude of the engine setpoint signal based on the determined transmission torque to control the torque delivered to the one or more components of the transmission to less than a predetermined torque design value.

10. The overload protection system according to claim 9, wherein:
the primary power equipment unit is selectively operable in a first mode to deliver rated power to the transmission for a predetermined first work application of the work vehicle;
the primary power equipment unit is selectively operable in a power boost mode to deliver boost power greater than the rated power to the transmission for a predetermined second work application of the work vehicle; and
the overload protection logic is executable by the processor to limit the magnitude of the engine setpoint signal to control the torque delivered to the one or more components of the transmission by the primary power equipment unit for the primary power equipment unit operating in the power boost mode to less than the torque design value.

11. The overload protection system according to claim 10, wherein:
the transmission comprises a split path transmission; and
the primary power equipment unit is selectively operable in the power boost mode to deliver the boost power to a continuously variable power source for accelerating or decelerating the associated work vehicle in a transport application of the work vehicle as the second work application.

12. The overload protection system according to claim 10, wherein:
the primary power equipment unit comprises a battery and a motor coupled with the battery; and
the overload protection logic is executable by the processor to limit the magnitude of the engine setpoint signal to control the torque delivered to the one or more components of the transmission by the motor for the primary power equipment unit operating in the power boost mode to less than the torque design value.

13. The overload protection system according to claim 10, wherein:
the primary power equipment unit is selectively operable in the power boost mode to deliver the boost power for a predetermined third work application of the associated work vehicle to a combination of the primary power equipment unit and an associated secondary power equipment unit operatively coupled with the work vehicle;
the primary power equipment unit comprises a continuously variable power source;
the associated secondary power equipment unit comprises a power take off device operatively coupled with the transmission;
the transmission comprises a split path transmission; and
the primary power equipment unit is selectively operable in the power boost mode to deliver the boost power to the power take off device for powering an associated driven working implement operable complimentary to the work vehicle in a joint working application of the work vehicle as the third work application.

14. The overload protection system according to claim 10, wherein:
the primary power equipment unit is selectively operable in the power boost mode to deliver the boost power for a predetermined third work application of the work vehicle to a combination of the primary power equipment unit and a plurality of associated secondary power equipment units operatively coupled with the work vehicle;
the primary power equipment unit comprises a continuously variable power source;
the plurality of associated secondary power equipment units comprise one or more of:
a power take off device operatively coupled with the transmission;
a hydraulic pump device operatively coupled with the engine; and/or
an electric generator operatively coupled with the engine;
the transmission is a split path transmission; and
the primary power equipment is selectively operable in the power boost mode to deliver the boost power to the plurality of associated secondary power equipment units for powering a plurality of associated driven working implements operable complimentary to the work vehicle in a joint working application of the work vehicle as the third work application.

15. The overload protection system according to claim 9, wherein:
the primary power equipment unit comprises a continuously variable power source; and
the overload protection logic is executable by the processor to determine the transmission torque applied to the one or more components of the transmission based on the commanded torque of the continuously variable power source and a torque gear ratio constant of the transmission.

16. An overload protection system controlling torque delivered to a transmission of an associated work vehicle including a primary power equipment unit, an engine operable to deliver power to the primary power equipment unit in response to an engine setpoint signal, an output member, and a transmission operably coupling the output member with the primary power equipment unit such that the output member receives power from the primary power equipment unit to drive the output member, the overload protection system comprising:
a primary power equipment torque sensor in operative communication with the primary power equipment unit, the primary power equipment torque sensor generating a primary power equipment torque signal representative of torque delivered to the transmission by the primary power equipment unit; and
an overload protection system controller comprising:
a processor;
an input operatively coupled with the processor and receiving the primary power equipment torque signal;
a non-transient memory device operatively coupled with the processor; and
overload protection logic stored in the memory device, the overload protection logic being executable by the processor to:
limit a magnitude of the engine setpoint signal based on the primary power equipment torque signal to control the torque delivered to the transmission by the primary power equipment unit to less than a torque design value.

17. The overload protection system according to claim 16, wherein:
the engine of the associated work vehicle is selectively operable in a first mode to deliver rated power to the primary power equipment unit for a predetermined first work application of the work vehicle, and in a power boost mode to deliver boost power greater than the rated power to the primary power equipment unit for a predetermined second work application of the work vehicle; and
the overload protection logic is executable by the processor to limit the magnitude of the engine setpoint signal to control the torque delivered to the transmission by the primary power equipment unit for the engine operating in the power boost mode to less than the torque design value.

18. The overload protection system according to claim 17, wherein:
the primary power equipment unit comprises a continuously variable power source.

19. The overload protection system according to claim 16, wherein:
the primary power equipment torque sensor is operable to generate a torque signal representative of torque delivered to the transmission by a combination of the primary power equipment unit and the engine for the transmission operated in a split path mode operably coupling the output member with the primary power equipment unit and the engine such that the output member receives power from the combination of the primary power equipment unit and the engine; and the overload protection logic is executable by the processor to limit the magnitude of the engine setpoint signal based on the torque signal to control the torque delivered to the transmission by the combination of the primary power equipment unit and the engine.

\* \* \* \* \*